United States Patent [19]

Seiler

[11] Patent Number: 5,298,607
[45] Date of Patent: Mar. 29, 1994

[54] REACTIVE DYES CONTAINING FLUOROTRIAZINE AND VINYLSULFONYL RADICALS

[75] Inventor: Herbert Seiler, Reihen, Switzerland

[73] Assignee: Ciba-Geigy Corporation, Ardsley, N.Y.

[21] Appl. No.: 63,848

[22] Filed: May 26, 1993

Related U.S. Application Data

[63] Continuation of Ser. No. 747,464, Aug. 13, 1991, abandoned, which is a continuation of Ser. No. 944,624, Dec. 19, 1986, abandoned, which is a continuation of Ser. No. 808,128, Dec. 12, 1985, abandoned, which is a continuation of Ser. No. 612,934, May 22, 1984, abandoned, which is a continuation of Ser. No. 498,681, May 31, 1983, abandoned, which is a continuation of Ser. No. 317,736, Nov. 3, 1981, abandoned, which is a continuation of Ser. No. 175,995, Aug. 7, 1980, abandoned, which is a continuation of Ser. No. 54,316, Jul. 2, 1979, abandoned.

[30] Foreign Application Priority Data

Jul. 6, 1978 [CH] Switzerland............ 7380/789

[51] Int. Cl.$^5$ .............. C09B 62/04; C09B 62/06; C09B 62/08; C09B 62/10; D06P 1/38; D06P 3/66

[52] U.S. Cl. .................... 534/638; 534/598; 534/617; 534/618; 534/622; 534/623; 534/624; 534/625; 534/626; 534/627; 534/628; 534/629; 534/631; 534/632; 534/633; 534/634; 534/635; 534/636; 534/637; 534/641; 534/642; 540/139; 544/181; 544/189; 544/104; 544/213

[58] Field of Search ............... 534/617, 622, 623, 624, 534/635, 626, 627, 629, 631, 632, 633, 634, 635, 636, 637, 638, 641, 642, 639, 618

[56] References Cited

U.S. PATENT DOCUMENTS

| | | | |
|---|---|---|---|
| 3,223,470 | 12/1965 | Boedeker et al. | 534/638 X |
| 3,351,594 | 11/1967 | Clark et al. | 534/638 X |
| 3,426,018 | 2/1969 | Eckersley, I et al. | 534/638 X |
| 3,455,897 | 7/1969 | Barben, I | 534/622 |
| 3,474,084 | 10/1969 | Griffiths et al. | 534/638 |
| 3,496,174 | 2/1970 | Eckersley, II et al. | 534/638 X |
| 3,544,547 | 12/1970 | Crabtree et al. | 534/622 |
| 3,591,577 | 7/1971 | Moiso et al. | 534/638 |
| 3,627,749 | 12/1971 | Ackermann | 334/638 |
| 3,758,470 | 9/1973 | Ackermann et al. | 534/638 X |
| 3,966,705 | 6/1976 | Oesterlein et al. | 534/638 |
| 4,033,943 | 7/1977 | Ramanathan et al. | 534/638 |

FOREIGN PATENT DOCUMENTS

| | | | |
|---|---|---|---|
| 879073 | 10/1961 | United Kingdom | 534/638 |
| 901434 | 7/1962 | United Kingdom | 534/638 |
| 1118785 | 7/1968 | United Kingdom | 534/638 |
| 1119529 | 7/1968 | United Kingdom | 534/638 |

OTHER PUBLICATIONS

H. H. Sumner et al., Melliand 42 Oct. 1961, pp. 1161-1166+1 (1961).

Organic Chemistry-fifth Edition-Robert Thornton Morrison et al., (1987).

H. Zollinger, Color Chemistry, Verlag Chemie, p. 142 (1987).

K. Venkataraman, vol. VI, FIG. 12 p. 358 (1972).

The Chemistry of Synthetic Dyes, vol. VI, Reactive Dyes, (1972), K. Vendataramen.

Harms, "Organofluorine Chemicals and Their Industrial Applications", Chapter 9, p. 202 (1979).

*Primary Examiner*—Floyd D. Higel
*Attorney, Agent, or Firm*—Edward. McC. Roberts; Kevin T. Mansfield

[57] ABSTRACT

The invention provides reactive dyes of the formula

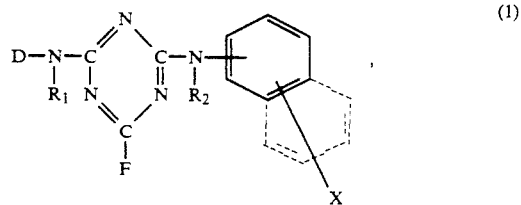

(1)

wherein D is a mono- or polyazo, metal complex azo, anthraquinone, phthalocyanine, formazane, dioxazine or stilbene dye which contains sulfo groups, $R_1$ is hydrogen or $C_1$-$C_4$ alkyl, $R_2$ is hydrogen, methyl or ethyl, X is a radical of the formula $-SO_2CH_2CH_2Cl$, $-SO_2CH=CH_2$, $-SO_2CH_2CH_2OSO_3H$, $-SO_2CH_2CH_2OPO_3H$ or $-N(R_3)SO_2CH_2CH_2OSO_3H$, and $R_3$ is hydrogen, methyl or ethyl, and the benzene or naphthalene radical is not further substituted or is further substituted by $C_1$–$C_4$ alkyl, $C_1$–$C_4$ alkoxy, halogen, nitro, hydroxyl, carboxyl or sulfo; the dyes are suitable for dyeing and printing a variety of materials especially cellulosic materials; they are distinguished by high reactivity and produce dyeings having good wet- and lightfastness properties; they have also good fixation properties and produce dyeings of notably high tinctorial strength.

6 Claims, No Drawings

REACTIVE DYES CONTAINING FLUOROTRIAZINE AND VINYLSULFONYL RADICALS

This application is a continuation of Ser. No. 07,747,464, filed Aug. 13, 1991, now abandoned, which is a continuation of Ser. No. 06/944,624, filed Dec. 19, 1986, now abandoned, which was a continuation of Ser. No. 06/808,128, filed Dec. 12, 1985, now abandoned, which was a continuation of Ser. No. 06/612,934, filed May 22, 1984, now abandoned, which was a continuation of Ser. No. 06/498,681, filed May 31, 1983, now abandoned, which was a continuation of Ser. No. 06/317,736, filed Nov. 3, 1981, now abandoned, which was a continuation of Ser. No. 06/175,995, filed Aug. 7, 1980, now abandoned, which was a continuation of Ser. No. 06/054,316, filed Jul. 2, 1979 now abandoned.

The present invention provides reactive dyes of the formula

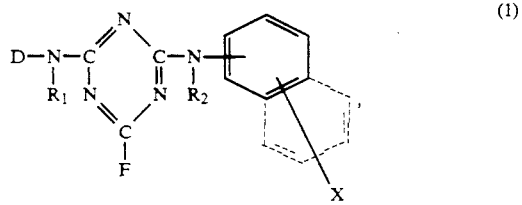

(1)

wherein D is the radical of an organic dye which contains sulfo groups, $R_1$ is hydrogen or $C_1$-$C_4$ alkyl, $R_2$ is hydrogen, methyl or ethyl, X is a radical of the formula —$SO_2CH_2CH_2Cl$, —$SO_2CH=CH_2$, —$SO_2CH_2CH_2OSO_3H$, —$SO_2CH_2CH_2OPO_3H$ or —$N(R_3)SO_2CH_2CH_2OSO_3H$, and $R_3$ is hydrogen, methyl or ethyl, and the benzene or naphthalene radical can contain further substituents in addition to X.

In the reactive dyes of the formula (1), the radical D is in particular the radical of a dye of the mono- or polyazo, metal complex azo, anthraquinone, phthalocyanine, formazane, azomethine, nitroaryl, dioxazine, phenazine or stilbene series.

Preferred reactive dyes are those of formula (1), wherein D is the radical of a mono- or disazo dye.

As alkyl of 1 to 4 carbon atoms, the substituent $R_1$ in formula (1) is methyl, ethyl, propyl, isopropyl, butyl, isobutyl, sec-butyl and tert-butyl.

If the radical bonded through the —$N(R_2)$ bridge member to the s-triazine ring is a naphthalene radical, it can be bonded in the α- or β-position.

In addition to containing one or more sulfo groups, the radical D in formula (1) can contain further substituents, for example alkyl groups of 1 to 4 carbon atoms, such as methyl, ethyl, propyl, isopropyl and butyl, alkoxy groups of 1 to 4 carbon atoms, such as methoxy, ethoxy, propoxy, isopropoxy and butoxy, acylamino groups of 1 to 6 carbon atoms, such as acetylamino, propionylamino and benzoylamino, halogen, such as fluorine, chlorine and bromine, nitro, cyano, trifluoromethyl, sulfamoyl, carbamoyl, ureido, hydroxyl, carboxyl, and sulfomethyl.

In addition to X, the benzene or naphthalene radical in formula (1) can contain e.g. the following further substituents: $C_1$-$C_4$ alkyl, $C_1$-$C_4$ alkoxy, halogen, such as fluorine, chlorine and bromine, nitro, hydroxyl, carboxyl and sulfo.

Preferred reactive dyes of the formula (1) are those wherein $R_1$ is hydrogen, methyl or ethyl, and each of $R_2$ and $R_3$ is a hydrogen atom.

An important class of reactive dyes comprises those of the formula

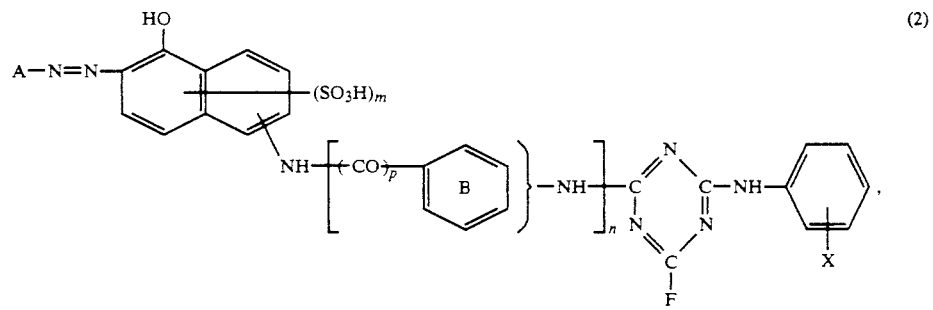

(2)

wherein A is a benzene or naphthalene radical, m is 1 or 2, n is 0 or 1 and p is 0 or 1, while the benzene or naphthalene radical A and the benzene radical B can contain further substituents and X is as defined for formula (1).

Further eligible substituents in the benzene or naphthalene radical A and the benzene radical B are the same as those named as possible substituents in the radical D in the definition of formula (1).

If the radical D or A contains complex forming groups, such as hydroxyl, carboxyl, amino and sulfo groups, it is also possible to obtain the heavy metal complexes of the reactive dyes of the formulae (1) and (2).

A valuable reactive dye of the class characterised by formula (2) is that of the formula

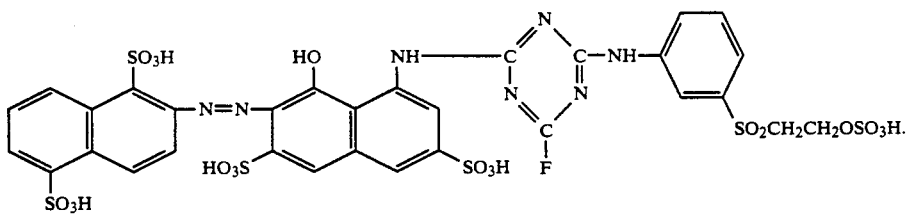

The reactive dyes of the formula (1) are obtained by condensing in any order, 2,4,6-trifluoro-s-triazine of the formula

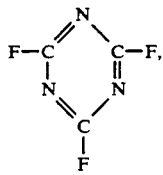 (4)

an organic dye of the formula

 (5)

which contains sulfo groups, or a primary product thereof, and an amine of the formula

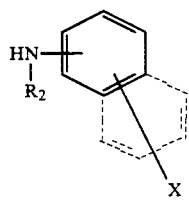 (6)

to produce a reactive dye of the formula (1), and, if primary products are used, converting these latter into the desired end dyes of the formula (1).

Organic dyes of the formula (5) which contain sulfo groups are, in particular, those wherein D is the radical of a dye of the mono- or polyazo, metal complex azo, anthraquinone, phthalocyanine, formazane, azomethine, nitroaryl, dioxazine, phenazine or stilbene series.

Preferred starting materials are organic dyes of the formula (5) which contain sulfo groups, in which D is the radical of a mono- or disazo dye.

As the individual process steps described above can be carried out in varying sequence, and, if desired, in some cases also simultaneously, different variants of the process are possible.

In general, the reaction is carried out stepwise in succession and the sequence of the simple reactions between the individual reaction components of the formulae (4), (5) and (6) can be freely chosen.

Important processes variants for obtaining the reactive dyes of the formula (1) comprise
1) condensing 2,4,6-trifluoro-s-triazine of the formula (4) with an organic dye of the formula (5) which contains sulfo groups and condensing the primary condensation product with an amine of the formula (6);
2) condensing 2,4,6-trifluoro-s-triazine of the formula (4) with an amine of the formula (6) and condensing the primary condensation product with an organic dye of the formula (5) which contains sulfo groups.

In a modification of the above process, the reactive dyes of the formula (1), wherein D is the radical of an organic dye which is composed of two or more components and contains sulfo groups, can be obtained by condensing one component of the dye of the formula (5) which contains a

group, a 2,4,6-trifluoro-s-triazine of the formula (4) and an aminobenzene of the formula (6), and, in any step of the process, reacting the condensation product with the other component or components of the dye of the formula (5) to produce a reactive dye of the formula (1).

Examples of such organic dyes which are composed of two or more components are: monoazo, disazo, trisazo, tetraazo, metal complex azo, formazane and azomethine dyes.

The above described process modification is chiefly of importance for the manufacture of reactive dyes of the formula (1), wherein D is the radical of an azo dye which contains sulfo groups. In these dyes, that portion of the azo dyestuff radical to which the s-triazine radical is bonded can be either the radical of the diazo component or the radical of the coupling component. This possibility gives rise to two variants of the above described modification of the process.

The first of these two variants consists in condensing a diazo component which contains a

group with 2,4,6-trifluoro-s-triazine of the formula (4), diazotising the resulting condensation product and coupling the diazo compound to a coupling component, and reacting the resulting azo compound, before or after the coupling, with an amine of the formula (6).

The second variant consists in condensing a coupling component which contains a

group with 2,4,6-trifluoro-s-triazine of the formula (4) and coupling a diazotised diazo component to the condensation product and reacting the resulting azo compound, before or after the coupling, with an amine of the formula (6).

In this process variant, it is possible to obtain reactive dyes of the formula (1) which contain two reactive s-triazine radicals by condensing a diazo component which contains a

—NH
|
R₁ group with a 2,4,6-trifluoro-s-triazine of the formula (4), and also condensing a coupling component which contains a

—NH
|
R₁ group with a 2,4,6-trifluoro-s-trianzine of the formula (4) and diazotising the condensation product of the diazo component and coupling the diazonium compound to the condensation product of the coupling component and reacting the resulting azo compound, before or after the coupling, with an amine of the formula (6).

Reactive dyes, which contain two or more reactive s-triazine radicals can also be obtained by condensing organic dyes of the formula (5) which contain sulfo groups and which contain further

—NH
|
R₁ groups in the radical D, with a corresponding amount of the 2,4,6-trifluoro-s-triazine of the formula (4), so that two or more s-triazine radicals are introduced into the dye molecule.

A preferred embodiment of the process for the manufacture of the reactive dyes of the formula (1) comprises the use of organic dyes of the formula (5) which contain sulfo groups, wherein D is the radical of a mono- or disazo dye, as starting materials, or condensing diazo components and/or coupling components which contain a —N(R₁)H group with the 2,4,6-trifluoro-s-triazine of the formula (4), and subsequently, or after the further condensation with the amine of the formula (6), obtaining the dye by coupling with the other component or other components of the mono- or disazo dye respectively.

A further preferred embodiment is that wherein the starting materials are organic dyes of the formula (5) which contain sulfo groups, wherein R₁ is hydrogen, methyl or ethyl, and amines of the formula (6), wherein each of R₂ and R₃ is a hydrogen atom.

The preferred reactive dyes of the formula (2) are obtained by reacting, in any order, a diazotised amino compound of the formula

A—NH₂ (7)

a coupling component of the formula

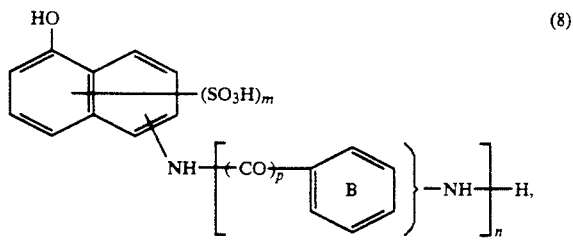
(8)

2,4,6-trifluoro-s-triazine of the formula (4) and an amine of the formula

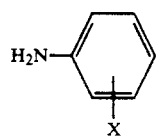
(9)

by coupling and condensation, to produce a reactive dye of the formula (2).

The most important process variants for obtaining the reactive dyes of the formula (2) comprise 1) coupling a diazotised amino compound of the formula (7) with a coupling component of the formula (8) to produce an azo compound of the formula

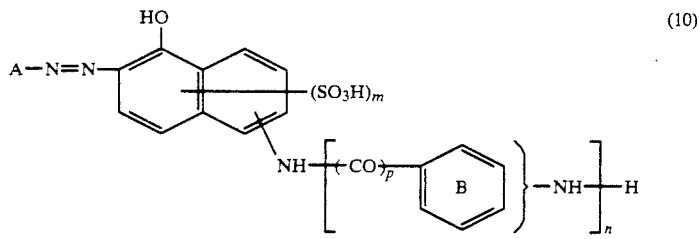
(10)

condensing this azo compound with 2,4,6-trifluoro-1,3,5-triazine of the formula (4) and condensing the primary condensation product with an amine of the formula (9) to produce a reactive dye of the formula (2);

2) condensing a coupling component of the formula (8) with 2,4,6-trifluoro-1,3,5-triazine of the formula (4), condensing the primary condensation product with an amine of the formula (9) and coupling the secondary condensation product with a diazotised amino compound of the formula (7) to produce a reactive dye of the formula (2);

3) condensing a coupling component of the formula (8) with 2,4,6-trifluoro-1,3,5-triazine of the formula (4), coupling a diazotised amino compound of the formula (7) to the primary condensation product and condensing the resulting azo compound with an amine of the formula (9) to produce a reactive dye of the formula (2).

If the end reactive dyes of the formula (1) and (2) contain complex forming groups, they can subsequently be reacted with heavy metal donors.

The particularly valuable reactive dye of the formula (3) is preferably obtained by process variant 2) by condensing 1-amino-8-hydroxynaphthalene-3,6-disulfonic acid with cyanuric fluoride, condensing the primary condensation product with 1-aminobenzene-3-β-sulfatoethylsulfone, and coupling diazotised 2-aminonaphthalene-1,5-disulfonic acid to the secondary condensation product.

As starting materials for the manufacture of the dyes of the formula (1) there may be mentioned:

a) 2,4,6-Trifluoro-s-triazine (cyanuric fluoride) of the formula (4)

b) Organic dyes of the formula (5) which contain sulfo groups

1. Monoazo compounds of the formula

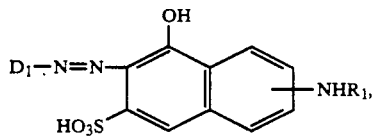 (11)

wherein $D_1$ is an at most bicyclic aryl radical which contains no azo groups and -NHR groups, $R_1$ is hydrogen or $C_1$-$C_4$ alkyl and the -$NHR_1$ group is preferably bonded to the 5-, 6-, 7- or 8-position of the naphthalene nucleus, and which additionally can contain a sulfonic acid group in the 5- or 6-position of the naphthalene nucleus.

$D_1$ can be a radical of the naphthalene or benzene series which does not contain any azo substitutents, for example a stilbene, diphenyl, benzthiazolyphenyl or diphenylamino radical. In this class, attention is also drawn to the related dyes in which the -NHR group, instead of being bonded to the naphthalene nucleus, is bonded to a benzoylamino or anilino group which is bonded to the 5-, 6-, 7- or 8-position of the naphthalene nucleus.

Particularly valuable starting dyes are those wherein $D_1$ is a sulfonated phenyl or naphthyl radical, especially those which contain a -$SO_3H$ group in the ortho-position to the azo bond. The phenyl radical can be further substituted, for example by halogen atoms, such as chlorine atoms, alkyl radicals, such as methyl, acylamino groups, such as acetylamino and alkoxy radicals, such as methoxy.

2. Disazo compounds of the formula (11), wherein $D_1$ is a radical of the azobenzene, azonaphthalene or phenylazonaphthalene series and the naphthalene nucleus is substituted by the -$NHR_1$ group and, if desired, by sulfonic acid, as in class 1.

3. Monoazo compounds of the formula

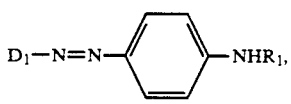 (12)

wherein $D_1$ is an at most bicyclic aryl radical, as described in class 1, and is preferably a disulfonaphthyl radical or a stilbene radical, $R_1$ is as defined above, and the benzene nucleus can contain further substituents, such as halogen atoms or alkyl, alkoxy, carboxylic acid, ureido and acylamino groups.

4. Monozzo or diazo compounds of the formula

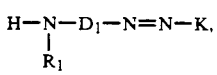 (13)

wherein $D_1$ is an arylene radical, for example a radical of the azobenzene, azonaphthalene or phenylazonaphthalene series or, preferably, an at most bicyclic arylene radical of the benzene or naphthalene series and K is the radical of a naphtholsulfonic acid or the radical of an enolised or enolisable ketomethylene compound (such as an acetoacetarylide or a 5-pyrazolone) with the OH group in the ortho-position to the azo group, and $R_1$ has the above meaning. $D_1$ represents preferably a radical of the benzene series which contains a sulfonic acid group.

5. Monoazo or diazo compounds of the formula $$D_1-N=N-K_1-NHR_1 \quad (14),$$

wherein $D_1$ is a radical of the types defined for $D_1$ in classes 1 and 2 above and $K_1$ is the radical of an enolisable ketomethylene compound (such as an acetoacetarylide or a 5-pyrazolone) with the OH group in the ortho-position to the azo group.

6. The metal complex compounds, for example the copper complexes, chromium complexes and cobalt complexes of the formulae (11) to (14), wherein each of $D_1$, K and $K_1$ has the indicated meaning, and furthermore a metallisable group (for example a hydroxyl, lower alkoxy or carboxylic acid group) is present in the ortho-position to the azo group in $D_1$.

EXAMPLES

Class 1

6-amino-1-hydroxy-2-(2'-sulfophenylazo)-naphthalene-3-sulfonic acid, 6-methylamino-1-hydroxy-2-(4'-acetylamino-2'-sulfophenylazo)-naphthalene-3-sulfonic acid, 8-amino-1-hydroxy-2-(2'-sulfophenylazo)-naphthalene-3,6-disulfonic acid, 8-amino-1-hydroxy-2-(4'-chloro-2'-sulfophenylazo)-naphthalene-3,5-disulfonic acid, 7-amino-2-(2',5'-disulfophenylazo)-1-hydroxynaphthalene-3-sulfonic acid, 7-methylamino-2-(2'-sulfophenylazo)-1-hydroxynaphthalene-3-sulfonic acid, 7-methylamino-2-(4'-methoxy-2'-sulfophenylazo)-1-hydroxy-naphthalene-3-sulfonic acid, 8-(3'-aminobenzoylamino)-1-hydroxy-2-(2'-sulfophenylazo)-naphthalene-3,6-disulfonic acid, 8-amino-1-hydroxy-2,2'-azonaphthalene-1',3',5',6-tetrasulfonic acid, 8-amino-1-hydroxy-2,2'-azonaphthalene-1',3', 5'-trisulfonic acid, 6-amino-1-hydroxy-2,2'-azonaphthalene-1',3',5'-trisulfonic acid, 6-amino-1-hydroxy-2,2'-azonaphthalene-1',3',5'-trisulfonic acid, 6-methylamino-1-hydroxy-2,2'-azonaphthalene-1',3',5'-trisulfonic acid, 7-amino-1-hydroxy-2,2'-azonaphthalene-1',3-disulfonic acid, 8-amino-1-hydroxy-2-(4'-hydroxy-3'-carboxyphenylazo)-naphthalene-3,6-disulfonic acid and 6-amino-1-hydroxy-2-(4'-hydroxy-3'-carboxyphenylazo)-naphthalene-3,5-disulfonic acid.

Class 2

8-amino-1-hydroxy-2-[4'-(2''-sulfophenylazo)-2'-methoxy-5'-methylphenylazo]-naphthalene-3,6-disulfonic acid, 8-amino-1-hydroxy-2-[4'-(4''-methoxyphenylazo)-2'-carboxyphenylazo]-naphthalene-3,6-disulfonic acid, 8-amino-1-hydroxy-2-[4'-(2''-hydroxy-3'',6''-disulfo-1''-naphthylazo)-2'-carboxyphenylazo]-naphthalene-3,6-disulfonic acid, 4,4'-bis-(8''-amino-1''-hydroxy-3'',6''-disulfo-2''-naphthylazo)-3,3'dimethoxydiphenyl and 6-amino-1-hydroxy-2-[4'-(2''-sulfophenylazo)-2'-methoxy-5'-methylphenylazo]-naphthalene-3,5-disulfonic acid.

Class 3

2-(4'-amino-2'-methylphenylazo)-naphthalene-4,8-disulfonic acid, 2-(4'-amino-2'-acetylaminophenylazo)-naphthalene-5,7-disulfonic acid, 4-nitro-4'-(4''-methylaminophenylazo)-stilbene-2,2'-disulfonic acid, 4-nitro-4'-(4''-amino-2''-methyl-5''-methoxyphenylazo)-stilbene-2,2'-disulfonic acid, 4-amino-4'-(4''-methoxyphenylazo)-stilbene-2,2'-disulfonic acid, and 4-amino-2-methylazobenzene-2',5'-disulfonic acid.

Class 4

1-(2',5'-dichloro-4'-sulfophenyl)-3-methyl-4-(3''-amino-4''-sulfophenylazo)-5-pyrazolone, 1-(4'-sulfophenyl)-3-carboxy-4-(4'-amino-3''-sulfophenylazo)-5-pyrazolone, 1-(2'-methyl-5'-sulfophenyl)-3-methyl-4-(4''-amino-3''-sulfophenylazo)-5-pyrazolone, 1-(2'-sulfophenyl)-3-methyl-4-(3''-amino-4''-sulfophenylazo)-5-pyrazolone, 4-amino-4'-(3''-methyl-1''-phenyl-4''-pyrazol-5''-onylazo)-stilbene-2,2'-disulfonic acid, 4-amino-4'-(2''-hydroxy-3'',6''-disulfo-1''-naphthylazo)-stilbene-2,2'-disulfonic acid, 8-acetylamino-1-hydroxy-2-(3'-amino-4'-sulfophenylazo)-naphthalene-3,6-disulfonic acid, 7-(3'-sulfophenylamino)-1-hydroxy-2-(4'-amino-2'-carboxyphenylazo)-naphthalene-3-sulfonic 8-phenylamino-1-hydroxy-2-(4''-amino-2'-sulfophenylazo)-naphthalene-3,6-disulfonic acid and 6-acetylamino-1-hydroxy-2-(5'-amino-2'-sulfophenylazo)-naphthalene-3-sulfonic acid.

Class 5

1-(3'-aminophenyl)-3-methyl-4-(2',5'-disulfophenylazo)-5-pyrazolone, 1-(3'-aminophenyl)-3-carboxy-4-(2'-carboxy-4'-sulfophenylazo)-5-pyrazolone, 4-amino-4'-[3'''-methyl-4''-(2''', 5'''-disulfophenylazo)-1'pyrazol-5''-onyl]-stilbene-2,2'-disulfonic acid and 1-(3'-aminophenyl)-3-carboxy-4-[4''-(2''',5'''-disulfophenylazo)-2''-methoxy-5''-methylphenylazo]-5-pyrazolone.

Class 6

The copper complex of 8-amino-1-hydroxy-2-(2'-hydroxy-5''-sulfophenylazo)-naphthalene-3,6-disulfonic acid, the copper complex of 6-amino-1-hydroxy-2-(2'-hydroxy-5'-sulfophenylazo)-naphthalene-3-sulfonic acid, the copper complex of 6-amino-1-hydroxy-2-(2'-hydroxy-5'-sulfophenylazo)-naphthalene-3,5-disulfonic acid, the copper complex of 8-amino-1-hydroxy-2(2'-hydroxy-3'-chloro-5'-sulfophenylazo)-naphthalene-3,5-disulfonic acid, the copper complex of 6-methylamino-1-hydroxy-2-(2'-carboxy-5'-sulfophenylazo)-naphthalene-3-sulfonic acid, the copper complex of 8-amino-1-hydroxy-2-[4'-(2''-sulfophenylazo)-2'-methoxy-5'-methylphenylazo]-naphthalene-3,6-disulfonic acid, the copper complex of 6-amino-1-hydroxy-2-[4'-(2'',5''-disulfophenylazo)-2'-methoxy-5'-methylphenylazo]-naphthalene-3,5-disulfonic acid, the copper complex of 1-(3'-amino-4'-sulfophenyl)-3-methyl-4-[4''-(2'''-5'''-disulfophenylazo)-2''-methoxy-5''-methylphenylazo]-5-pyrazolone, the copper complex of 7-(4'-amino-3'-sulfoanilino)-1-hydroxy-2-[4''-(2''',5'''-disulfophenylazo)-2''-methoxy-5''-methylphenylazo]-naphthalene-3-sulfonic acid, the copper complex of 6-(4'-amino-3'-sulfoanilino)-1-hydroxy-2-(2''-carboxyphenylazo)-naphthalene-3-sulfonic acid, the 1,2-chromium complex of 7-amino-6'-nitro-1,2'-dihydroxy-2,1'-azonaphthalene-3,4-disulfonic acid, the 1,2-chromium complex of 6-amino-1-hydroxy-2-(2'-carboxyphenylazo)-naphthalene-3-sulfonic acid, the 1,2-chromium complex of 8-amino-1-hydroxy-2-(4'-nitro-2'-hydroxyphenylazo)-naphthalene-3,6-disulfonic acid, the 1,2-cobalt complex of 6-(4'-amino-3'-sulfoanilino)-1-hydroxy-2-(5''-chloro-2'-hydroxyphenylazo)-naphthalene-3-sulfonic acid, the 1,2-chromium complex of 1-(3'-amino-4'-sulfophenyl)-3-methyl-4-(2''-hydroxy-4''-sulfo-1''-naphthylazo)-5-pyrazolone, the 1,2-chromium complex of 7-(4'-sulfoanilino)-1-hydroxy-2-(4''-amino-2''-carboxyphenylazo)-naphthalene-3-sulfonic acid.

Particularly important azo dyes which can be used for the production of the reaction dyes of the formula (1) are the azo dyes of the formulae

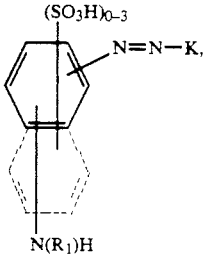

(15)

-continued

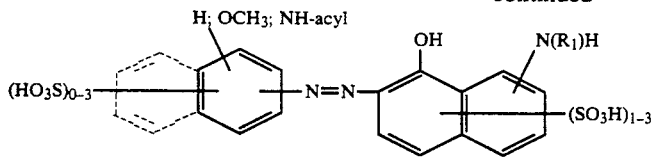
(16)

and

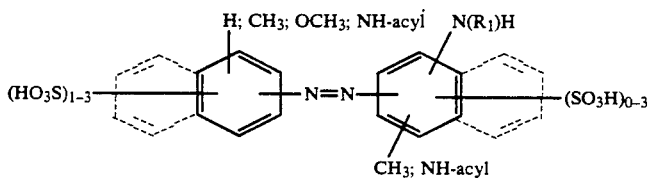
(17)

wherein K is the radical of a coupling component of the benzene, naphthalene or heterocyclic series, acyl is a low molecular aliphatic acyl radical of not more than 3 carbon atoms or an aromatic radical of not more than 8 carbon atoms and $R_1$ is as defined for formula (1), and the metal complex azo dyes of the formulae

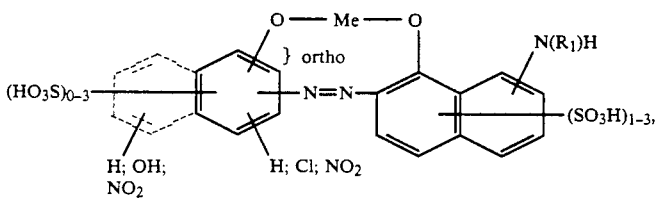
(18)

and

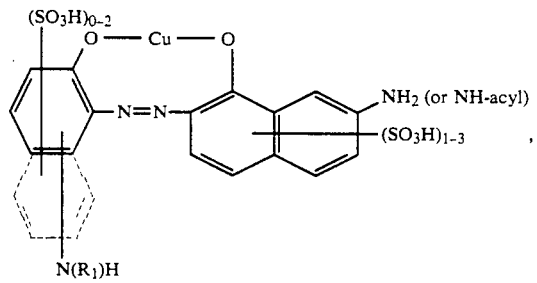
(19)

wherein R and acyl are as defined in the formulae (15), (16) and (17) and Me represents Cu, Cr or Co.

7. Anthraquinone compounds which contain a group of the formula —$NHR_1$, wherein $R_1$ has the above meaning, bonded to an alkylamino or arylamino group, which is itself bonded to the α-position of the anthraquinone nucleus, in particular of the formula

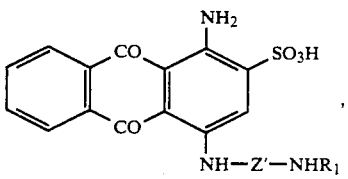
(20)

wherein the anthraquinone nucleus can contain an additional sulfonic acid group in the 5-, 6-, 7- or 8-position and Z' is a bridge member which is preferably a divalent radical of the benzene series, for example a phenylene, diphenylene or 4,4'-stilbene or azobenzene radical. Preferably Z' should contain one sulfonic acid group for each benzene ring present.

EXAMPLES 1-amino-4-(4'-aminoanilino)-anthraquinone-2,3'-disulfonic acid and the corresponding 2,3', 5-, 2,3', 6- and 2,3', 7-trisulfonic acids, 1-amino-4-(4"-amino-4'-benzoylaminoaniline)-anthraquinone-2,3'-disulphonic acid and the corresponding 2,3'5-trisulfonic acid, 1-amino-4-[4-'-(4"'-aminophenylazo)-anilino]-anthraquinone-2,2",5-trisulfonic acid, 1-amino-4-(4'-amino-3'-carboxyanilino)-anthraquinone-2,5-disulfonic acid, 1-amino-4-(3'-aminoanilino)-anthraquinone-2,4',5-trisulfonic acid and the corresponding 2,4-disulfonic acid, 1-amino-4-['-(4"-aminophenyl)-anilino]-anthraquinone-2,3",5-trisulfonic acid, 1-amino-4-(4'-methylamino)-anilino-anthraquinone-2,3'-disulfonic acid and the corresponding 2,3',5-trisulfonic acid, 1-amino-4-(4'-n-butylamino)-anilino-anthraquinone-2,3'-disulfonic acid, 1-amino-4-(4'-methylamino-3'-carboxyanilino)-anthaquinone-2-sulfonic acid, 1-amino-4-(3'-β-hydroxyethylamino)-anilinoanthraquinone-2,5-disulfonic acid, 1-(4'-aminoanilino)-anthraquinone-2,3'-disulfonic acid and 1-amino-4-(4'-amino-2'-methoxyanilino)-anthraquinone-2,3'-disulfonic acid.

8. Phthalocyanine compounds of the formula

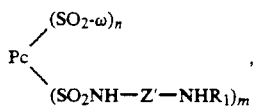

wherein Pc denotes a phthalocyanine nucleus, preferably copper phthalocyanine, ω is —OH and/or —NH₂, Z' is a bridge member, preferably an aliphatic, cycloaliphatic or aromatic bridge, and each of n and m is 1, 2 or 3 and can be identical or different, provided that the sum of n+m is not greater than 4.

The dye compounds of the phthalocyanine series which can be used as starting materials in the process of the invention are preferably metal-containing phthalocyanines, such as copper phthalocyanines, which contain at least one water-solubilising group, such as a sulfonic acid group, and at least one group of the formula —NHR₁, wherein R₁ has the above meaning. The —NHR₁ group or groups can be bonded direct or through a divalent bridge to the benzene rings of the phthalocyanine nucleus, for example through a —phenylen—, —CO—phenylene—, —SO₂—phenylene—, —NH—phenylene—, —S—phenylene—, —O—phenylene, —CH₂S—phenylene—, —CH₂O—phenylene—, —CH₂—phenylene—, —SCH₂—phenylene—, —SO₂CH₂—phenylene—, —SO₂—NR—phenylene—, —CH₂—, —SO₂NR—arylene, —NRCO—phenylene—, —NRSO₂—phenylene, —SO₂O—phenylene—, —CH₂—, —CH₂NR—phenylene—, —CH₂NH—CO—phenylene—, —SO₂N-R—alkylene—, —CH₂NR—alkylene—, —CON-R—phenylene—, —CONR—arylene—, —SO₂— or —CO— bridge. In the above divalent bridge members, R is hydrogen alkyl or cycloalkyl, arylene denotes a divalent aromatic radical which is unsubstituted or substituted, for example by halogen, alkyl or alkoxy, and wherein the terminal bonds may be attached to identical or different nuclei, and alkylene denotes a divalent aliphatic radical which can include heteroatoms, such as nitrogen, in the chain of atoms, for example the radical —CH₂CH₂—NH—CH₂—CH₂—.

As examples of such divalent aromatic radicals, which are referred to as arylene, there may be mentioned: aromatic nuclei, for example a benzene, naphthalene, acridine and carbazole nucleus, which can carry further substituents, and radicals of the formula

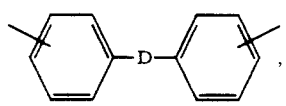

wherein the benzene rings can carry further substituents and —D— denotes a bridging group, for example —CH=CH—, —NH—, —S—, —O—, —SO₂—, —NO=N—, —N=N—, —NH—CO—NH—CO—NH—, —O—CH₂CH₂O— or

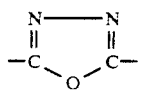

EXAMPLES 3-(3'-amino-4'-sulfophenyl)-sulfamyl-copper phthalocyanine-tri-3-sulfonic acid,
di-4-(3'-amino-4'-sulfophenyl)-sulfamyl-copper phthalocyanine-di-4-sulfonic acid,
3-(3'-aminophenylsulfamyl)-3-sulfamyl-copper phthalocyanine-di-3-sulfonic acid,
copper phthalocyanine-4-N-(4-amino-3-sulfophenyl)-sulfonamide-4',4", 4'''-trisulfonic acid,
cobalt phthalocyanine-4-4'-di-N-(4'-amino-4'-sulfophenyl)-carboxamide-4",4'''-dicarboxylic acid, and
copper-4-(4'-amino-3'-sulfobenzoyl)-phthalocyanine.

Mixtures of phthalocyanines can also be used. For example, a mixture of approximately equal parts of copper phthalocyanine-N-(4-amino-3-sulfophenyl)-sulfonamide-trisulfonic acid and copper phthalocyanine-di-N-(4-amino-3-sulfophenyl)-sulfonamide-disulfonic acid can be used.

9. Nitro dyes of the formula

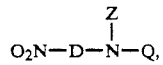

wherein D is a naphthalene or benzene nucleus which can be further substituted, the nitrogen atom N is in the ortho-position to the nitro group, Z is a hydrogen atom or an unsubstituted or substituted hydrocarbon radical and Q is a hydrogen atom or an organic radical bonded to the nitrogen through a carbon atom, and wherein Q and Z are not both hydrogen atoms, and Q can be bonded to Z, if Z is a hydrocarbon radical, or can be bonded to D in the ortho-position to the nitrogen atom N to form a heterocyclic ring, and which contain at least one group of the formula —NHR₁, wherein R₁ has the above meaning, in particular nitro dyes of the formula

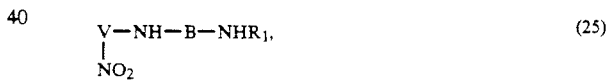

wherein V and B are monocyclic aryl nuclei and the nitro group in V is the ortho-position to the NH group.

EXAMPLE

4-Amino-2'nitro-diphenylamine-3,4'-disulfonic acid

9. Metal complexes of formazane dyes of the formula

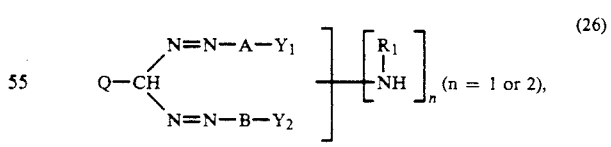

wherein Q is an organic radical, a nitro or cyano group, A and B are radicals of diazo components of the benzene, naphthalene or heterocyclic series and each of Y₁ and Y₂ is a substituent which is bound in the ortho-position to the azo group and which is able to form a complex with a heavy metal, and R₁ has the indicated meaning. The radical Q is especially a radical of the benzene series, such as phenyl or sulfophenyl, or a low molecular alkyl group, such as a methyl group, a low molecular alkanoyl group, a low molecular, preferably C₁–C₄-carbalkoxy group, a benzoyl group or a heterocyclic radical, and A and B are preferably phenyl radicals which are substituted by sulfo, sulfonamido or alkylsulfonyl groups. Suitable substituents $Y_1$ and $Y_2$ are above all the hydroxyl and carboxyl groups. Suitable heavy metals are copper, chromium, cobalt and nickel.

EXAMPLES

The copper complex of 2'-carboxy-2''-hydroxy-3''-amino-1,3,5-triphenylformazane-4'-5'',3'''-trisulfonic acid, The copper complex of 2',2''-dihydroxy-3'-amino-5'-methylsulfonyl-1,3,5-triphenyl-3'',5'',4'''-trisulfonic acid, The copper complex of 2'-carboxy-4'-amino-2''-hydroxy-1,3,5-triphenylformazane-3'',5'',2'''-trisulfonic acid, The copper complex of 2'-hydroxy-2''-carboxy-4'''-amino-1,3,5-triphenylformazane-4'-4''-disulfonic acid, The copper complex of 2',2''-dihydroxy-5''-amino-1,5-diphenyl-3-methylformazane-5',3''-disulfonic acid, The copper complex of 2',2''-dihydroxy-5'-amino-1,3,5-triphenylformazane-3'-3''-5''-trisulfonic acid, The copper complex of 2'-carboxy-3'-amino-2''-hydroxy-3'''(1''''-phenyl-3''''-methyl-pyrazol-5''''-onyl-4''''-azo)-1,3,5-triphenylformazane-3'',5'', 2'''',5''''-tetrasulfonic acid, The nickel complex of 2',2''-dicarboxy-1,5-diphenyl-3-(m-aminobenzoyl)-formazane-4'-4''-disulfonic acid.

The following diazo and coupling components are particularly suitable for the manufacture of the preferred reactive dyes of the formula (1), wherein D is the radical of an azo dye: Diazo components: aminobenzene, 1-amino-2-, -3- or -4-methylbenzene, 1-amino-2-, -3- or -4-methoxybenzene, 1-amino-2-3- or -4-chlorobenzene, 1-amino-2,5-dichlorobenzene, 1-amino-2,5-dimethylbenzene 1-amino-3-methyl-6-methoxybenzene, 1-amino-2-methoxy-4-nitrobenzene, 4-aminodiphenyl, 1-aminobenzene-2-, -3- or -4-carboxylic acid, 2-aminodiphenylether, 1-aminobenzene-2-, -3- or -4-sulfonamide, -N-methylamide, -N-ethylamide, -N,N-dimethylamide or -N,N-diethylamide, dehydrothio-p-toluidine-sulfonic acid, 1-amino-3-trefluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenze-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -5-, -6- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, 3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonyl-benzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynapthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-amino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6-or -4,6-disulfonic acid, 2-(4'-amino-3'-sulfophenylamino)-5-hydroxynaphthalene-7-sulfonic acid, 3-methylpyrazolone-(5), 1-phenyl-3-methyl-5-pyrazolone, 1-(4'-sulfophenyl)-3-methyl-5-pyrazolone, 1-(4'-sulfophenyl)-pyrazolone-(5)-3-carboxylic acid, 1-(3'-aminophenyl)-3-methyl-5- pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphthyl-[2']-3-methyl-5-pyrazolone, 1-(',7'-disulfonaphthyl-[2']-3-methyl-5-pyrazolone, 1-(2',5'dichloro-4'-sulfophenyl)-3-methyl-5-pyrazolone, 3-aminocarbonyl-4-methyl-6-hydroxypyridone-2,1-ethyl-3-cynao- or -3-chloro-4-methyl-t-hydroxypyridone-2,1-ethyl-3-sulfomethyl-4-methyl-6-hydroxypyridone-2,2,4,6-triamino-3-cyanopyridine, 2-(3'-sulfophenylamino)-4,6-diamino-3-cyanopyridine, 2-(2'-hydroxyethylamino-3-cyano-4-methyl-6-aminopyridine, 2,6-bis-(2'-hydroxyethylamino)-3-cyano-4methylpyridn, 1-ethyl-3-carbamoyl-4-methyl-6-hydroxypyridone-(2), 1-ethyl-3-sulfomethyl-4-methyl-5-carbamoyl-6-hydroxypridone-(2), N-acetoacetylaminobenzene, 1-(N-acetoacetylamino)-2-methoxybenzene-5-sulfonic acid, 4-hydroxyquinolone-(2), 1-amino-8-hydroxy-7-(phenylazo)naphthalene-3,6-disulfonic acid, 1-amino-8-hydroxy-7-(4'-sulfophenylazo)-naphthalene-3,6-disulfonic acid, 1-amino-8-hydroxy-7-(2'5'-disulfophenylazo)-naphthalene-3,6-disulfonic acid.

AMINES OF THE FORMULA (6)

1-aminobenzene-2-, -3- or -4-β-sulfatoethylsulfone,
1-aminobenzene-3-β-phosphatoethylsulfone, 1-amino-4-methylbenzene-3-β-sulfatoethylsulfone, 1-aminobenzene-3-β-chloroethylsulfone, 1-amino-4-methoxybenzene-3-β-sulfatoethylsulfone,
1-aminobenzene-4-β-sulfatoethylsulfone-2-sulfonic acid,
1-aminobenzene-5-β-sulfatoethylsuflone-2-sulfonic acid,
1-aminobenzene-5-β-sulfatoethylsulfone-2,4-disulfonic acid,
1-aminonaphthalene-4-β-sulfatoethylsulfone,
1-amino-2,5-dimethoxybenzene-4-β-sulfatoethylsulfone,
1-aminobenzene-4-β-sulfatoethylsulfone-2-carboxylic acid,
1-aminobenzene-5-β-sulfatoethylsulfone-2-carboxylic acid,
1-amino-2-methoxybenzene-4-β-sulfatoethylsulfone,
1-amino-2-chlorobenzene-4-β-sulfatoethylsulfone,
1-amino-2-methoxybenzene-5-β-sulfatoethylsulfone,
2-aminonaphthalene-8-β-sulfatoethylsulfone,
2-aminonaphthalene-8-β-sulfatoethylsulfone, 6-sulfonic acid,
1-amino-2,5-dimethoxybenzene-4-vinylsulfone,
1-amino-2-methoxy-5-methylbenzene-4-β-sulfatoethylsulfone,
1-amino-2,5-diethoxybenzene-4-β-sulfatoethylsulfone,
1-amino-2-bromobenzene-4-β-sulfatoethylsulfone,
1-amino-2-bromobenzene-4-vinylsulfone,
1-aminobenzene-5-vinylsulfone-2,4-disulfonic acid,
1-aminobenzene-5-β-phosphatoeäthylsulfone-2,4-disulfonic acid,
1-aminobenzene-5-β-chloroethylsulfone-2,4-disulfonic acid,
2-aminonaphthalene-8-β-phosphatoethylsulfone-6-sulfonic acid,
2-aminonaphthalene-8-vinylsulfone-6-sulfonic acid,
1-amino-2-methoxy-5-methylbenzene-4-β-chlorethylsulfone,
2-aminophenol-4-β-sulfatoethylsulfone,
1-aminobenzene-3- or -4-vinylsulfone,
1-amino-2-hydroxybenzene-4-β-sulfatoethylsulfone,
1-aminobenzene-5-vinylsulfone-2sulfonic acid,
3-(N-methyl-β-sulfatoethylsulfonylamino)-1-aminobenzene,
3-(N-ethyl-β-sulfatoethylsulfonylamino)-1-aminobenzene,
3-β-sulfatoethylsulfonylamino-1-aminobenzene.

In the manufacture of the preferred reactive dyes of the formula (1), wherein D is the radical of an azo dye which contains sulfo groups, in particular of a mono- or disazo dye, the diazotisation of the intermediates which contain a diazotisable amino group is usually effected by treatment with nitrous acid in an aqueous solution of a mineral acid at low temperature, and the coupling is carried out at weakly acid or neutral to weakly alkaline pH values.

The condensation reactions of the 2,4,6-trifluoro-s-triazine of the formula (4) with the organic dyes of the formula (5) which contain sulfo groups, or with the primary products thereof which contain a $-N(R_1)H$ group, and the amines of the formula (6), are preferably carried out in aqueous solution or suspension, at low temperature and at weakly acid or neutral to weakly alkaline pH value, and such that a fluorine atom remains as removable radical in the end of the formula (1). The hydrogen fluoride which is liberated during the condensation is advantageously neutralised continously by the addition of aqueous alkali hydroxides, carbonates or bicarbonates.

If the reactive dyes of the formula (1), wherein D is the radical of an azo dye which contains sulfo groups, contains complex forming groups in the o,o'-position to the azo group, e.g. hydroxyl or carboxyl groups, it is also possible to obtain metal complexes of the azo dyes of the formula (1) by treating the azo compounds which contain complex forming groups in the o,o'-position to the azo group, before, or optionally also after, the condensation with the 2,4,6-trifluoro-s-triazine of the formula (4), with metal donors.

Copper complexes of azo dyes of the formula (1) are of particular interest. A suitable method of metallation, in addition to that described above, is also that of dealkylating metallation and, for the production of copper complexes, oxidative coppering.

The dyes of the formula (1) are fibre-reactive, as they contain a removable fluorine atom in the s-triazine radical.

By fibre-reactive compounds are meant those compounds which react with the hydroxyl groups of cellulose or with the amino groups of natural or synthetic polyamides to form covalent chemical bonds.

The dyes of formula (1) are new. They are distinguished by high reactivity and produce dyeings having good wet- and lightfastness properties. They have in addition good fixation properties and produce dyeings of notably high tinctorial strength. The good build-up of the red azo dyes of the formula (1), in particular of those of the formula (2), on bleached cotton yarn, is to be singled out for special mention.

The reactive dyes of the formula (1) are suitable for dyeing and printing a very wide variety of materials, such as silk, leather, wool, polyamide fibres and polyurethanes, but especially cellulosic materials of fibrous structure, such as linen, cellulose, regenerated cellulose, and especially cotton. They are suitable both for dyeing by the exhaust method and for dyeing by the pad-dyeing process, in which the goods are impregnated with aqueous and, if desired, also with salt containing dye solutions, and the dyes are fixed after treatment with alkali or in the presence of alkali, with or without the application of heat.

They are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

The manufacture of the mono- or disazo intermediates is not described in every case in the Examples, but it can be readily inferred from the foregoing description.

In the following Examples, the parts and percentages are by weight.

EXAMPLE 1

24.5 parts of the dye of the formula

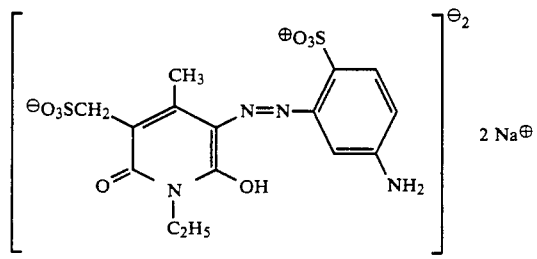

are dissolved neutral in 400 parts of water. The solution is cooled with ice to 0°–5° C. and then, at this temperature, 7.1 parts of 2,4,6-trifluoro-1,3,5-triazine are added dropwise in the course of 15 minutes, whilst keeping the reaction mixture at pH 5–6 with the simultaneous addition of sodium hydroxide solution. As soon as no more starting dye can be detected by chromatography, 14.8 parts of 1-aminobenzene-3-$\beta$-sulfatoethylsulfone are added. A pH of 6 to 6.5 is maintained by continuously neutralising the liberated hydrogen fluoride with 2N sodium hydroxide solution and raising the temperature to 20° C. When the reaction is complete, the reactive dye is salted out with sodium chloride, collected by filtration, washed and dried in vacuo. It is a yellow powder and dyes cotton and regenerated cellulose in clear yellow shades.

Dyes with similar properties are obtained by condensing the amino dyes of column 2 in Table 1 with equivalent parts of 2,4,6-trifluoro-1,3,5-triazine and immediately thereafter with the amines of column 3 in accordance with the particulars of this Example.

TABLE 1

| No | Amino dye | Amine | Shade on cotton |
|----|-----------|-------|-----------------|
| 1 | 2-aminonaphthalene-1,5-disulfonic acid → 1-amino-3-acetylaminobenzene | 1-aminobenzene-3-$\beta$-sulfatoethylsulfone | reddish yellow |
| 2 | 2-aminonaphthalene-1,5-disulfonic acid → 3-aminophenylurea | 1-aminobenzene-3-$\beta$-sulfatoethylsulfone | reddish yellow |
| 3 | 2-aminonaphthalene-1,5-disulfonic acid → 1-amino-3-hydroxyacetylaminobenzene | 1-aminobenzene-3-$\beta$-phosphatoethylsulfone | reddish yellow |
| 4 | 2-aminonaphthalene-5,7-disulfonic acid → 1-amino-3-acetylaminobenzene | 1-aminobenzene-2-$\beta$-sulfatoethylsulfone | reddish yellow |
| 5 | 2-aminonaphthalene-5,7-disulfonic acid → 3-aminophenylurea | 1-aminobenzene-4-$\beta$-sulfatoethylsulfone | reddish yellow |
| 6 | 2-aminonaphthalene-4,8-disulfonic acid → 1-amino-3-methylbenzene | 1-aminobenzene-3-$\beta$-sulfatoethylsulfone | yellow |
| 7 | 2-aminonaphthalene-4,8-disulfonic acid → 1-amino-3-acetylaminobenzene | 1-aminobenzene-3-$\beta$-sulfatoethylsulfone | " |
| 8 | 2-aminonaphthalene-3,6-disulfonic acid → 1-amino-3-acetylaminobenzene | 1-aminobenzene-3-$\beta$-sulfatoethylsulfone | reddish yellow |
| 9 | 2-aminonaphthalene-3,6-disulfonic acid → 3-aminophenylurea | 1-aminobenzene-3-$\beta$-sulfatoethylsulfone | reddish yellow |
| 10 | 2-aminonaphthalene-6,8-disulfonic acid → 1-amino-3-acetylaminobenzene | 1-aminobenzene-3-$\beta$-sulfatoethylsulfone | reddish yellow |
| 11 | 2-aminonaphthalene-6,8-disulfonic acid → 1-amino-2-methoxynaphthalene-6-sulfonic acid | 1-aminobenzene-3-$\beta$-sulfatoethylsulfone | reddish yellow |
| 12 | 2-aminonaphthalene-3,6,8-trisulfonic acid → 1-amino-3-acetylaminobenzene | 1-aminobenzene-3-$\beta$-sulfatoethylsulfone | reddish yellow |
| 13 | 2-aminonaphthalene-3,6,8-trisulfonic acid → 3-aminophenylurea | 1-aminobenzene-3-$\beta$-sulfatoethylsulfone | reddish yellow |
| 14 | 2-aminonaphthalene-3,6,8-trisulfonic acid → 1-amino-3-methylbenzene | 1-aminobenzene-3-$\beta$-sulfatoethylsulfone | reddish yellow |
| 15 | 2-aminonaphthalene-4,6,8-trisulfonic acid → 1-amino-3-methylbenzene | 1-aminobenzene-3-$\beta$-sulfatoethylsulfone | reddish yellow |
| 16 | 2-aminonaphthalene-4,6,8-trisulfonic acid → 1-amino-3-acetylaminobenzene | 1-aminobenzene-3-$\beta$-sulfatoethylsulfone | reddish yellow |
| 17 | 1-aminobenzene-2,5-disulfonic acid → 1-aminonaphthalene-6-sulfonic acid | 1-aminobenzene-3-$\beta$-sulfatoethylsulfone | reddish yellow |
| 18 | 1-aminobenzene-2,5-disulfonic acid → 1-amino naphthalene-6-sulfonic acid → 1-aminonaphthalene-8-sulfonic acid | 1-aminobenzene-3-$\beta$-sulfatoethylsulfone | reddish brown |
| 19 | 1-aminonaphthalene-2,5,7-trisulfonic acid → 1-aminonaphthalene-6-sulfonic acid → 1-amino-napthalene-8-sulfonic acid | 1-aminobenzene-3-$\beta$-sulfatoethylsulfone | violet brown |
| 20 | 1-aminonaphthalene-2,5,7-trisulfonic acid → 1-amino-2,5-dimethylbenzene → 1-aminonaphthalene | 1-aminobenzene-3-$\beta$-sulfatoethylsulfone | reddish brown |

TABLE 1-continued

| No | Amino dye | Amine | Shade on cotton |
|---|---|---|---|
| | 6-sulfonic acid | | |
| 21 | 4-aminoazobenzene-3,4'-disulfonic acid → 1-aminonaphthalene-6-sulfonic acid | 1-aminobenzene-3-β sulfatoethylsulfone | yellowish brown |
| 22 | 1,4-diaminobenzene-2,5-disulfonic acid → 1-ethyl-3-sulfomethyl-4-methyl-6-hydroxy-pyridone-(2)-5-carboxamide | 1-amino-4-methylbenzol-3-β-sulfatoethylsulfone | yellow |
| 23 | 1-amino-3-acetylaminobenzene-6-sulfonic acid → 1-ethyl-3-sulfomethyl-4-methyl-6-hydroxy-pyridone-(2)-5-carboxamide (saponified) | 1-aminobenzene-3-β sulfatoethylsulfone | " |
| 24 | 1-amino-3-acetylaminobenzene-6-sulfonic acid → 1-ethyl-3-aminocarbonyl-4-methyl-6-hydroxy-pyridone-(2) (saponified) | 1-aminobenzene-3-β sulfatoethylsulfone | " |
| 25 | 1-amino-3-acetylaminobenzene-6-sulfonic acid → 1-(2',5'-dichloro-4'-sulfophenyl)-3-methyl-pyrazolone-(5) (saponified) | 1-aminobenzene-3-β sulfatoethylsulfone | " |
| 26 | 1-amino-3-acetylaminobenzene-6-sulfonic acid → 1-(2',5'-disulfophenyl)-3-methyl-pyrazolone-(5) (saponified) | 1-aminobenzene-3-β sulfatoethylsulfone | yellow |
| 27 | 1-amino-3-acetylaminobenzene-6-sulfonic acid → 1-(4'-sulfophenyl)-3-carboxy-pyrazolone-(5) (saponified) | 1-aminobenzene-3-β sulfatoethylsulfone | " |
| 28 | 1-amino-3-acetylaminobenzene-6-sulfonic acid → 1-(2'-methyl-4'-sulfophenyl)-3-carboxy-pyrazolone-(5) (saponified) | 1-aminobenzene-3-β sulfatoethylsulfone | " |
| 29 | 1-amino-3-acetylaminobenzene-6-sulfonic acid → 1-(4',8'-disulfonaphthyl-[2'])-3-methyl-pyrazolone-(5) (saponified) | 1-aminobenzene-3-β sulfatoethylsulfone | " |
| 30 | 1-aminobenzene-2,5-disulfonic acid → 1-(3'-amino-phenyl)-3-methyl-pyrazolone-(5) (saponified) | 1-aminobenzene-3-β sulfatoethylsulfone | " |
| 31 | 1-aminobenzene-2,5-disulfonic acid → 2-acetyl-amino-5-hydroxynaphthalene-7-sulfonic acid (saponified) | 1-aminobenzene-3-β sulfatoethylsulfone | orange |
| 32 | 1-aminobenzene-2-sulfonic acid → 2-amino-5-hydroxynaphthalene-1,7-disulfonic acid | 1-aminobenzene-3-β sulfatoethylsulfone | " |
| 33 | 2-aminonaphthalene-1,5-disulfonic acid → 2-acetyl-amino-5-hydroxynaphthalene-7-sulfonic acid (saponified) | 1-aminobenzene-3-β-sulfatoethylsulfone | orange |
| 34 | 2-aminonaphthalene-3,6,8-trisulfonic acid 2-acetylamino-5-hydroxynaphthalene-7-sulfonic acid → (saponified) | 1-aminobenzene-3-β-sulfatoethylsulfone | " |
| 35 | 2-aminonaphthalene-1,5,7-trisulfonic acid → 1-acetylamino-5-hydroxynaphthalene-7-sulfonic acid (saponified) | 1-aminobenzene-3-β-sulfatoethylsulfone | " |
| 36 | 1-amino-4-methoxybenzene-2,5-disulfonic acid → 2-amino-5-hydroxynaphthalene-7-sulfonic acid | 1-aminobenzene-3-β-sulfatoethylsulfone | scarlet |
| 37 | 1-amino-4-methoxybenzene-2-sulfonic acid → 2-amino-5-hydroxynaphthalene-7-sulfonic acid | 1-aminobenzene-3-β-sulfatoethylsulfone | " |
| 38 | 1-aminobenzene-2-sulfonic acid → 1-(4'-nitrobenzoyl-amino)-8-hydroxynaphthalene-3,6-disulfonic acid (reduced) | 1-aminobenzene-3-β-sulfatoethylsulfone | red |
| 39 | 1-aminobenzene-2,5-disulfonic acid → 1-(3'-nitro-benzoylamino)-8-hydroxynaphthalene-4,6-disulfonic acid (reduced) | 1-aminobenzene-3-β-sulfatoethylsulfone | " |
| 40 | 2-amino-5-aminomethyl-naphthalene-1-sulfonic acid → 1-benzoylamino-8-hydroxynaphthalene-3,6-disulfonic acid | 1-aminobenzene-3-β-sulfatoethylsulfone | " |
| 41 | 2-aminonaphthalene-1,5-disulfonic acid → 1-(4'-nitro-benzoylamino)-8-hydroxynaphthalene-3,6-disulfonic acid (reduced) | 1-aminobenzene-3-β-sulfatoethylsulfone | red |
| 42 | 1-hydroxy-2-aminobenzene-4-sulfonic acid → 2-amino-5-hydroxynaphthalene-7-sulfonic acid (Cu-complex) | 1-aminobenzene-3-β-sulfatoethylsulfone | deep purplish red |
| 43 | 1-hydroxy-2-aminobenzene-4,6-disulfonic acid → 2-amino-5-hydroxynaphthalene-7-sulfonic acid (Cu-complex) | 1-aminobenzene-3-β-chloroethylsulfone | deep purplish red |
| 44 | 1-hydroxy-2-aminobenzene-4,6-disulfonic acid → 2-ethylamino-5-hydroxynaphthalene-7-sulfonic acid (Cu-complex) | 1-amino-4-methoxy-benzene-3-β-sulfato-ethylsulfone | deep purplish red |
| 45 | 1-hydroxy-2-aminobenzene-4,6-disulfonic acid → 2-amino-8-hydroxynaphthalene-3,6-disulfonic acid (Cu-complex) | 1-aminobenzene-3-β sulfatoethylsulfone | deep purplish red |
| 46 | 1-hydroxy-2-aminobenzene-4,6-disulfonic acid → 1-amino-8-hydroxynaphthalene-3,6-disulfonic acid (Cu-complex) | 1-aminobenzene-3-β sulfatoethylsulfone | violet |
| 47 | 1-hydroxy-2-aminobenzene-4,6-disulfonic acid → 1-amino-8-hydroxynaphthalene-4,6-disulfonic acid | 1-aminobenzene-3-β-sulfatoethylsulfone | violet |
| 48 | 1-hydroxy-2-amino-4-acetylaminobenzene-6-sulfonic acid → 1-amino-8-hydroxynaphthalene-2,4-disulfonic acid (Cu-complex) (saponified) | 1-aminobenzene-3-β-sulfatoethylsulfone | blue |
| 49 | 1-hydroxy-2-amino-6-acetylaminobenzene-4-sulfonic acid → 1-amino-8-hydroxynaphthalene-2,4-disulfonic acid, (saponified) (Cu-complex) | 1-aminobenzene-3-β-sulfatoethylsulfone | " |
| 50 | 1-amino-2-hydroxy-6-nitronaphthalene-4-sulfonic acid → 1-amino-8-hydroxynaphthalene-2,4-disulfonic acid, reduced (Cu-complex) | 1-aminobenzene-3-β-sulfatoethylsulfone | " |

TABLE 1-continued

| No | Amino dye | Amine | Shade on cotton |
|----|-----------|-------|-----------------|
| 51 | 1-amino-2-hydroxy-6-nitronaphthalene-4-sulfonic acid → 1-amino-8-hydroxynaphthalene-2,4,6-trisulfonic acid, reduced (Cu-complex) | 1-aminobenzene-3-β-sulfatoethylsulfone | " |
| 52 | 2-amino-1-hydroxynaphthalene-4,8-disulfonic acid → 1-amino-8-hydroxynaphthalene-3,6-disulfonic acid (Cu-complex) | 1-aminobenzene-3-β-sulfatoethylsulfone | " |
| 53 | 2-aminonaphthalene-4,8-disulfonic acid → 2-hydroxy-3-aminonaphthalene-5,7-disulfonic acid (coppered by oxidation) | 1-aminobenzene-3-β-sulfatoethylsulfone | blue |
| 54 | 3-methoxy-4-amino-6-methylazobenzene-2',5'-disulfonic acid → 2-methylamino-5-hydroxynaphthaline-7-sulfonic acid (coppered by demethylation) | 1-aminobenzene-3-β-sulfatoethylsulfone | navy blue |
| 55 | 3-methoxy-4-amino-6-methylazobenzene-2',4'-disulfonic acid → 2-amino-5-hydroxynaphthalene-1,7-disulfonic acid (coppered by demethylation) | 1-aminobenzene-3-β-sulfatoethylsulfone | " |
| 56 | 1-amino-3-acetylaminobenzene-6-sulfonic acid → 1-amino-8-hydroxy-2-(4'-sulfophenylazo)-naphthalene-3,6-disulfonic acid (saponified) | 1-aminobenzene-3-β-sulfatoethylsulfone | blue |
| 57 | 1-amino-4-(3'-amino-2',4',6'-trimethylphenylamino)-anthraquinone-2,5'-disulfonic acid | 1-aminobenzene-3-β-sulfatoethylsulfone | " |
| 58 | 1-amino-4-(2',6'-dimethyl-3'-aminomethyl-phenylamino)-anthraquinone-2,5-disulfonic acid | 1-aminobenzene-3-β-sulfatoethylsulfone | reddish blue |
| 59 | 1-amino-4-(4'-methyl-2'-aminomethyl-phenylamino)-anthraquinone-2,6'-disulfonic acid | 1-aminobenzene-3-β-sulfatoethylsulfone | " |
| 60 | 1-amino-4-(5'-amino-phenylamino)-anthraquinone-2,2',4'-trisulfonic acid | 1-aminobenzene-3-β-sulfatoethylsulfone | blue |
| 61 | 1-amino-4-(4'-amino-phenylamino)-anthraquinone-2,3-disulfonic acid | 1-aminobenzene-3-β-sulfatoethylsulfone | " |
| 62 | 1-amino-4-(4'-amino-phenylamino)-anthraquinone-2,2'-disulfonic acid | 1-aminobenzene-3-β-sulfatoethylsulfone | " |
| 63 | 1-amino-4-(3'-amino-phenylamino)-anthraquinone-2,4'-disulfonic acid | 1-aminobenzene-3-β-sulfatoethylsulfone | " |
| 64 | 1-amino-4-(2'-methyl-3'-amino-phenylamino)-anthraquinone-2,5'-disulfonic acid | 1-aminobenzene-3-β-sulfatoethylsulfone | " |
| 65 | 1-amino-4-(2'-methyl-3'-amino-phenylamino)-anthraquinone-2,6,5'-trisulfonic acid | 1-aminobenzene-3-β-sulfatoethylsulfone | greenish blue |
| 66 | 1-amino-4-(5'-aminomethyl-phenylamino)-anthraquinone-2,2',4'-trisulfonic acid | 1-aminobenzene-3-β-sulfatoethylsulfone | blue |
| 67 | 1-amino-4-(4'-amino-cyclohexylamino)-anthraquinone 2,6-disulfonic acid | 1-aminobenzene-3-β-sulfatoethylsulfone | " |
| 68 | 1-amino-4-(4'-amino-cyclohexylamino)-anthraquinone 2-sulfonic acid | 1-aminobenzene-5-β-sulfatoethylsulfone-2,4-disulfonic acid | " |
| 69 | 1-amino-4-(3'-amino-4'-methyl-cyclohexyl-amino)-anthraquinone-2-sulfonic acid | 1-aminobenzene-5-β-sulfatoethylsulfone-2,4-disulfonic acid | blue |
| 70 | 1-amino-4-(3'-amino-2'-methyl-cyclohexyl-amino)-anthraquinone-2-sulfonic acid | 1-aminobenzene-5-β-sulfatoethylsulfone-2,4-disulfonic acid | " |
| 71 | 1-amino-4-(4'-amino-3'-methyl-cyclohexyl-amino)-anthraquinone-2-sulfonic acid | 1-aminobenzene-5-β-sulfatoethylsulfone-2,4-disulfonic acid | " |
| 72 | 1-amino-4-(4'-aminomethyl-cyclohexylamino)-anthraquinone-2-sulfonic acid | 1-aminobenzene-5-β-sulfatoethylsulfone-2,4-disulfonic acid | " |
| 73 | 1-amino-4-(3'-aminomethyl-cyclohexyl-amino)-anthraquinone-2-sulfonic acid | 1-aminobenzene-5-β-sulfatoethylsulfone-2,4-disulfonic acid | " |
| 74 | 1-amino-4-(2'-amino-ethylamino)-anthraquinone-2-sulfonic acid | 1-aminobenzene-5-β-sulfatoethylsulfone-2,4-disulfonic acid | " |
| 75 | 1-amino-4-(2'-methylamino-ethylamino)-anthraquinone-2-sulfonic acid | 1-aminobenzene-5-β-sulfatoethylsulfone-2-disulfonic acid | " |
| 76 | 1-amino-4-(3'-amino-1'-propylamino)-anthraquinone-2-sulfonic acid | 1-aminobenzene-5-β-sulfatoethylsulfone-2-disulfonic acid | " |
| 77 | 1-amino-4-(3'-methylamino-1'-propylamino)-anthraquinone-2-sulfonic acid | 1-aminobenzene-5-β-sulfatoethylsulfone-2-disulfonic acid | blue |
| 78 | 1-amino-4-(4'-amino-1'-butylamino)-anthraquinone-2-sulfonic acid | 1-aminobenzene-5-β-sulfatoethylsulfone-2,4-disulfonic acid | " |
| 79 | N-(2-carboxy-4-sulfophenyl)-N'-(2'-hydroxy-3'-amino-5'-sulfophenyl)-ms-phenylformazane (Cu-complex) | 1-aminobenzol-3-β-sulfatoethylsulfone | " |
| 80 | N-(2-carboxy-5-sulfophenyl)-N'-(2'-hydroxy-3'-amino-5'-sulfophenyl)-ms-phenylformazane | 1-aminobenzol-3-β-sulfatoethylsulfone | " |
| 81 | N-(2-carboxy-4-sulfophenyl)-N'-(2'-hydroxy-3'-amino-5'-sulfophenyl)-ms-(2''-chloro-5''-sulfophenyl)-formazane (Cu-complex) | 1-aminobenzene-3-β sulfatoethylsulfone | blue |

TABLE 1-continued

| No | Amino dye | Amine | Shade on cotton |
|---|---|---|---|
| 82 | N-(2-carboxy-4-aminophenyl)-N'-(2'-hydroxy-3',5'-disulfophenyl)-ms-(3''-sulfophenyl)-formazane (Cu-complex) | 1-aminobenzene-3-β-sulfatoethylsulfone | " |
| 83 | N-(2-carboxy-5-sulfophenyl)-N'-(2'-hydroxy-3',5'-disulfophenyl)-ms-(3''-aminophenyl)formazane (Cu-complex) | 1-aminobenzene-3-β-sulfatoethylsulfone | greenish blue |
| 84 | N-(2-hydroxy-3-amino-5-sulfophenyl)-N'-(2'-hydroxy-4'-sulfophenyl)-ms-(2''-sulfophenyl)-formazane (Cu-complex) | 1-aminobenzene-3-β-sulfatoethylsulfone | navy blue |
| 85 | N-(2-hydroxy-5-sulfophenyl)-N'-(2'-hydroxy-3',5'-disulfophenyl)-ms-(4''-aminophenyl)-formazane (Cu-complex) | 1-aminobenzene-3-β-sulfatoethylsulfone | blue |
| 86 | N-(2-hydroxy-5-amino-3-sulfophenyl)-N'-(2',5'-disulfophenyl)-ms-phenylformazane (Cu-complex) | 1-aminobenzene-3-β-sulfatoethylsulfone | " |
| 87 | N-(2-hydroxy-4,6-disulfophenyl)-N'-(2',5'-disulfophenyl)-ms-(3''-aminophenyl)-formazane (Cu-complex) | 1-aminobenzene-3-β-sulfatoethylsulfone | " |
| 88 | N-(2-hydroxy-4-sulfophenyl)-N'-(4'-amino-2'-sulfophenyl)-ms-(4''-chloro-3''-sulfophenyl)-formazane (Cu-complex) | 1-aminobenzene-3-β-sulfatoethylsulfone | blue |
| 89 | CuPc-(3) with substituents $(SO_3H)_2$, $SO_2NH_2$, $SO_2NH$-phenyl-$NH_2$ | 1-aminobenzene-3-β-sulfatoethylsulfone | turquoise blue |
| 90 | NiPc-(3) with substituents $(SO_3H)_2$, $SO_2NH_2$, $SO_2NH$-phenyl-$NH_2$ | 1-aminobenzene-3-β-sulfatoethylsulfone | " |
| 91 | CuPc-(3) with substituents $(SO_3H)_2$, $SO_2NH_2$, $SO_2NH$-phenyl-$NH_2$ | 1-aminobenzene-3-β-sulfatoethylsulfone | " |
| 92 | CuPc(3) with substituents $(SO_3H)_{2,7}$, $(SO_2NH$-phenyl-$NH_2)_{1,3}$ | 1-aminobenzene-3-β-sulfatoethylsulfone | " |
| 93 | CuPc-(3) with substituents $(SO_3H, SO_2NH_2)_{2,6}$, $(SO_2NH$-phenyl($NH_2$)-$SO_3H)_{1,3}$ | 1-aminobenzol-3-β-sulfatoethylsulfone | turquoise blue |
| 94 | CuPc-(4) with substituents $(SO_3H, SO_2NH_2)_{\sim2,6}$, $(SO_2NH$-phenyl($NH_2$)-$SO_3H)_{\sim1,4}$ | 1-aminobenzol-3-β-sulfatoethylsulfone | " |

TABLE 1-continued

| No | Amino dye | Amine | Shade on cotton |
|---|---|---|---|
| 95 | CuPc-(4) with (SO$_3$H)$_2$, SO$_2$NH$_2$, SO$_2$NH—C$_6$H$_4$—NH$_2$ (ortho) | 1-aminobenzol-3-β-sulfatoethylsulfone | " |
| 96 | NiPc-(4) with (SO$_3$H)$_3$, SO$_2$NH—C$_6$H$_4$—NH$_2$ (ortho) | 1-aminobenzol-3-β-sulfatoethylsulfone | " |
| 97 | CuPc-(3) with (SO$_3$H)$_{2.5}$, (SO$_2$NHCH$_2$CH$_2$NH$_2$)$_{1.5}$ | 1-aminobenzol-3-β-sulfatoethylsulfone | " |
| 98 | CuPc-(3) with (SO$_3$H)$_2$, SO$_2$NH$_2$, SO$_2$NHCH$_2$CH$_2$NH$_2$ | 1-aminobenzene-3-β-sulfatoethylsulfone | turquoise blue |

EXAMPLE 2

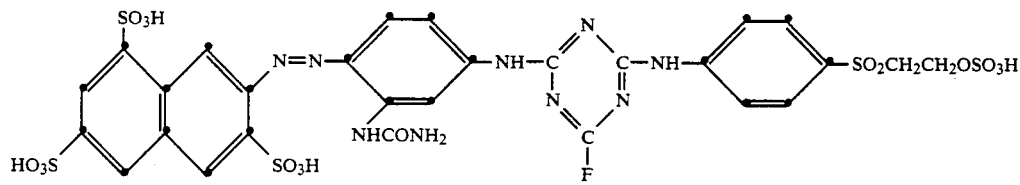

22 parts of 2,4-difluoro-6-(4'-β-sulfatoethylsulfonyl-phenylamino)-s-triazine are added at 20° C. to a neutral solution in 500 parts of water of 30.5 parts of the trisodium salt of the aminoazo dye obtained by coupling diazotised 2-aminonaphthalene-3,6,8-trisulfonic acid with 3-aminophenylurea in acetic acid medium, whilst keeping a pH value of 6 to 6.5 by the constant addition of 2N sodium hydroxide solution. The condensation is continued until no more starting dye can be detected by chromatography. The dye of the formula is salted out with sodium chloride, collected with suction, washed and dried. It dyes cellulose materials in very fast reddish yellow shades.

Table 2 lists further dyes which are obtained in analogous manner by reaction of the amino dyes in column 2 with the primary condensation products of 2,4,6-trifluoro-1,3,5-triazine and amine in column 3.

TABLE 2

| No | Amino dye | Condensation product of trifluorotriazine and | Shade on cotton |
|---|---|---|---|
| 1 | 2-aminonaphthalene-1,5-disulfonic acid → 1-amino-3-methylbenzene | 1-aminobenzene-4-β-sulfatoethylsulfone-2-sulfonic acid | yellow |
| 2 | 2-aminonaphthalene-1,5-disulfonic acid → 1-amino-3-methyl-6-methoxybenzene | 1-aminobenzene-5-β-sulfatoethylsulfone-2-sulfonic acid | reddish yellow |
| 3 | 2-aminonaphthalene-5,7-disulfonic acid → 1-amino-3-methylbenzene | 1-aminobenzene-5-β-sulfatoethylsulfone-2-sulfonic acid | reddish yellow |
| 4 | 2-aminonaphthalene-4,8-disulfonic acid → N-methylaminobenzene | 1-aminobenzene-5-β-sulfatoethylsulfone-2-sulfonic acid | yellow |
| 5 | 2-aminonaphthalene-4,8-disulfonic acid → 1-N-ethylamino-3-methylbenzene | 1-aminobenzene-4-β-sulfatoethylsulfone-2-carboxylic acid | yellow |
| 6 | 2-aminonaphthalene-3,6,8-trisulfonic acid → 1-aminobenzene | 1-aminobenzene-5-β-sulfatoethylsulfone-2-carboxylic acid | reddish yellow |
| 7 | 1-aminonaphthalene-2,5,7-trisulfonic acid → 1-amino-3-methyl-6-methoxybenzene → 1-aminonaphthalene-8-sulfonic acid | 1-aminobenzene-2-β-sulfatoethylsulfone | reddish brown |
| 8 | 1-amino-3-acetylaminobenzene-6-sulfonic acid → 1-ethyl-3-sulfomethyl-4-methyl-6-hydroxypyridone-(2)-5-carboxamide (saponified) | 1-amino-2-methoxybenzene-4-β-sulfatoethylsulfone | yellow |
| 9 | 1-amino-3-acetylaminobenzene-6-sulfonic acid → 1-ethyl-3-aminocarbonyl-4- | 1-aminobenzene-4-β-sulfatoethylsulfone | yellow |

TABLE 2-continued

| No | Amino dye | Condensation product of trifluorotriazine and | Shade on cotton |
|---|---|---|---|
|  | methyl-6-hydroxypyridone-(2) (saponified) |  |  |
| 10 | 1-amino-3-acetylaminobenzene-6-sulfonic acid → 1-(4'-sulfophenyl)-3-methyl-pyrazolone-(5) (saponified) | 1-aminobenzene-4-β-sulfatoethylsulfone | yellow |
| 11 | 1-amino-3-acetylaminobenzene-6-sulfonic acid → 1-(5',7'-disulfonaphthyl-[2'])-3-methylpyrazolone-(5) (saponified) | 1-amino-2-chlorobenzene-4-β-sulfatoethylsulfone | yellow |
| 12 | 1-aminobenzene-2,4-disulfonic acid → 2-acetylamino-5-hydroxynaphthalene-7-sulfonic acid (saponified) | 1-amino-2-methoxybenzene-5-β-sulfatoethyl-sulfone | orange |
| 13 | 2-aminonaphthalene-1,5-disulfonic acid → 2-acetylamino-5-hydroxynaphthalene-7-sulfonic acid (saponified) | 1-amino-2-methoxybenzene-5-β-sulfatoethyl-sulfone | orange |
| 14 | 1-amino-4-methoxybenzene-2-sulfonic acid → 2-amino-5-hydroxynaphthalene-7-sulfonic acid | 1-amino-benzene-5-β-sulfatoethylsulfone-2,4-disulfonic acid | scarlet |
| 15 | 2-aminonaphthalene-1,5-disulfonic acid → 2-acetylamino-8-hydroxynaphthalene-6-sulfonic acid (saponified) | 1-aminobenzene-4-β-sulfatoethylsulfone-2-sulfonic acid | yellowish red |
| 16 | 1-aminobenzene-2,4-disulfonic acid → 1-(4'-nitrobenzoylamino)-8-hydroxy-naphthalene-3,6-disulfonic acid (reduced) | 1-aminobenzene-4-β-sulfatoethylsulfone-2-sulfonic acid | red |
| 17 | 2-aminonaphthalene-1,5-disulfonic acid → 1-(4'-nitrobenzoylamino)-8-hydroxy-naphthalene-4,6-disulfonic acid (reduced) | 1-aminobenzene-5-β-sulfatoethylsulfone-2-sulfonic acid | red |
| 18 | 1-hydroxy-2-aminobenzene-4,6-disulfonic acid → 2-amino-8-hydroxynaphthalene-6-sulfonic acid (Cu-complex) | 1-aminobenzene-2-β-sulfatoethylsulfone | deep purplish red |
| 19 | 1-hydroxy-2-aminobenzene-5-sulfonic acid → 1-amino-8-hydroxynaphthalene-3,6-disulfonic acid (Cu-complex) | 1-aminobenzene-4-β-sulfatoethylsulfone | violet |
| 20 | 1-amino-2-hydroxy-6-nitronaphthalene-4-sulfonic acid → 1-amino-8-hydroxy-naphthalene-2,4-disulfonic acid (Cu-complex) | 1-aminobenzene-5-β-sulfatoethylsulfone-2,4-disulfonic acid | blue |
| 21 | 1-hydroxy-2-amino-4-acetylaminobenzene-6-sulfonic acid → 1-amino-8-hydroxy-naphthalene-2,4,6-trisulfonic acid (saponified, Cu-complex) | 1-aminonaphthalene-4-β-sulfatoethylsulfone | blue |
| 22 | 2-amino-1-methylbenzene-3,5-disulfonic acid → 1-amino-2-methoxy-5-methyl-benzene → 2-amino-5-hydroxynaphtha-lene-7-sulfonic acid (coppered by demthylation) | 1-aminobenzene-5-β-sulfatoethylsulfone-2-sulfonic acid | navy blue |
| 23 | 1-amino-3-acetylaminobenzene-6-sulfonic acid → 1-amino-8-hydroxy-2-(phenyl-azo)-naphthalene-3,6-disulfonic acid (saponified) | 1-aminobenzene-5-β-sulfatoethylsulfone-2,4-disulfonic acid | blue |
| 24 | 1-amino-3-acetylaminobenzene-6-sulfonic acid → 1-amino-8-hydroxy-2-(2',5'-disulfophenylazo)-naphthalene-3,6-disulfonic acid | 1-amino-2,5-dimethoxybenzene-4-β-sulfoethyl-sulfone | blue |

EXAMPLE 3

16 parts of 1-amino-8-hydroxynaphthalene-3,6-disulfonic acid are dissolved neutral in 400 parts of water. The reaction solution is adjusted to pH 4.5 and, with good stirring, 7 parts of 2,4,6-trifluoro-1,3,5-triazine are added dropwise at 0° to 3° C. The liberated hydrogen fluoride is neutralised by the metered addition of 2N sodium hydroxide solution. As soon as no more free 1-amino-8-hydroxynaphthalene-3,6-disulfonic acid can be detected, 10.6 parts of 1-aminobenzene-3-β-sulfatoethylsulfone in 50 parts of water are added. The temperature is allowed to rise to 20°–25° C. and the pH of the reaction solution is kept at 4 to 4.5. When the condensation is complete, the dyestuff intermediate is coupled at 0° to 10° C. with 15 parts of diazotised 2-aminonaphthalene-1,5-disulfonic acid. At a final pH of 6.5 to 7, the dye of the formula

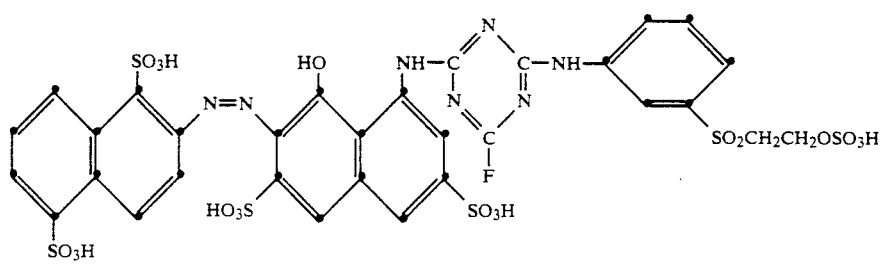

is salted out with sodium chloride, collected by filtration, washed and dried in vacuo. It is a dark red powder and dyes cotton and regenerated cellulose in bluish red shades of good wetfastness and good fastness to rubbing and light.

Diazo components whose coupling energy is sufficient for coupling in a pH range from 4 to 5.5 can be coupled to the primary condensation product obtained from coupling component and 2,4,6-trifluoro-1,3,5-triazine. The reaction with the amine then follows in the final step.

tion of 2N sodium hydroxide solution. The temperature is allowed to rise gradually to 20° C. Then 7 parts of solid sodium nitrite are added and, after this has dissolved completely, the reaction mixture is poured onto a mixture of 25 parts by volume of 10N hydrochloric acid and 100 parts of crushed ice. A neutralised solution of 1-ethyl-3-sulfomethyl-4-methyl-6-hydroxypyridone-(2)-5-carboxamide in 100 parts of water is then poured into the diazo solution. The pH is adjusted to 6.5 and the reaction mixture is stirred at this pH value until the coupling is complete. The dye of the formula

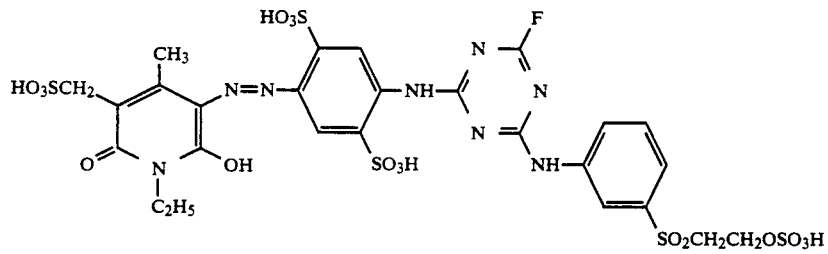

Table 3 lists further dyes which are obtained by reaction of 2,4,6-trifluoro-1,3,5-triazine with the coupling components of column 2, then with the amines of column 3, and finally by coupling with the diazo components of column 4.

is precipitated with sodium chloride and then isolated, dried and ground, affording an orange powder which dyes cotton from an aqueous bath in strong, slightly reddish yellow shades.

Table 4 lists further valuable dyes which dye cellu-

TABLE 3

| No | Coupling component | Amine | Diazo component | Shade on cotton |
|---|---|---|---|---|
| 1 | 1-amino-8-hydroxynaphthalene-3,6-disulfonic acid | 1-aminobenzene-3-β-sulfato-ethylsulfone | 1-aminobenzene-2-sulfonic acid | red |
| 2 | 1-amino-8-hydroxynaphthalene-4,6-disulfonic acid | 1-aminobenzene-3-β-phosphato-ethylsulfone | 1-aminobenzene-2-sulfonic acid | red |
| 3 | 1-amino-8-hydroxynaphthalene-3,6-disulfonic acid | 2-aminonaphthalene-8-β-sulfatoethylsulfone | 1-amino-4-carboxybenzene-2-sulfonic acid | red |
| 4 | 1-amino-8-hydroxynaphthalene-3,6-disulfonic acid | 1-aminobenzene-4-β-sulfato-ethylsulfone | 1-amino-4-methylbenzene-2-sulfonic acid | red |
| 5 | 1-amino-8-hydroxynaphthalene-3,6-disulfonic acid | 1-aminobenzene-3-β-sulfato-ethylsulfone | 1-aminobenzene-2,5-disulfonic acid | red |
| 6 | 1-amino-8-hydroxynaphthalene-3,6-disulfonic acid | 2-aminonaphthalene-8-β-sulfatoethylsulfone-6-sulfonic acid | 1-aminonaphthalene-1-sulfonic acid | red |
| 7 | 1-amino-8-hydroxynaphthalene-4,6-disulfonic acid | 1-aminobenzene-3-β-sulfato-ethylsulfone | 2-aminonaphthalene-1,5-disulfonic acid | red |
| 8 | 1-amino-8-hydroxynaphthalene-6-sulfonic acid | 1-aminobenzene-3-β-sulfato-ethylsulfone | 2-aminonaphthalene-1,5,7-trisulfonic acid | red |

Example 4

26.8 parts of 1,4-diamino-2,5-disulfonic acid are dissolved neutral in 250 parts of water with the addition of sodium hydroxide. After addition of 2,8 g of disodium phosphate, 13.6 parts of 2,4,6-trifluoro-1,3,5-triazine are added dropwise at 0° C. in the course of 5 minutes while keeping the pH of the reaction mixture at 6 with 2N sodium hydroxide solution. When the condensation is complete, a solution of 28 parts of 1-aminobenzene-3β-sulfatoethylsulfone in 100 parts of water is added and the pH is kept at 6.5 by the simultaneous dropwise addilose in the indicated shades and which are obtained by using the amines of column 2 instead of 1-aminobenzene-3-β-sulfatoethylsulfone and the coupling components of column 3 instead of 1-ethyl-3-sulfomethyl-4-methyl-6-hydroxypyridone-(2)-5-carboxamide after the condensation of 2,4,6-trifluoro-1,3,5-triazine with 1,4-diaminobenzene-2,5-disulfonic acid. Dyes with similar properties, but which produce more hypsochromic shades on cellulose material, are obtained by using 1,3-diaminobenzene-4,6-disulfonic acid instead of 1,4-diamino-2,5-disulfonic acid.

TABLE 4

| No | Amine | Coupling component | Shade on cotton |
|---|---|---|---|
| 1 | 1-aminobenzene-3-β-sulfatoethylsulfone | 1-(4'sulfophenyl)-3-methyl-pyrazolone-(5) | yellow |
| 2 | 1-aminobenzene-3-β-sulfatoethylsulfone | 1-(2',5'-dichloro-4'-sulfophenyl)-3-methylpyrazolone-(5) | yellow |
| 3 | 1-aminobenzene-3-β-phosphatoethylsulfone | 1-(2',5'-dichloro-4'-sulfophenyl)-3-methylpyrazolone-(5) | |
| 4 | 1-aminobenzene-3-β-sulfa- | 1-(4',8'-disulfonaphthyl-[2']-3-methyl- | reddish yellow |

TABLE 4-continued

| No | Amine | Coupling component | Shade on cotton |
|---|---|---|---|
|  | toethylsulfone | pyrazolone-(5) |  |
| 5 | 1-aminobenzene-3-β-sulfa-toethylsulfone | 1-ethyl-3-aminocarbonyl-4-methyl-6-hydroxypyridone-(2) | reddish yellow |
| 6 | 1-aminobenzene-3-β-sulfa-toethylsulfone | 4-amino-3,5-disulfo-acetoacetaniline | yellow |
| 7 | 1-aminobenzene-3-β-chlor-oethylsulfone | 1-hydroxynaphthalene-4-sulfonic acid | bluish red |
| 8 | 3-(N-methyl-β-sulfato-ethylsulfonylamino)-1-aminobenzene | 1-hydroxynaphthalene-4,6-disulfonic acid | red |
| 9 | 1-aminobenzene-3-β-sulfa-toethylsulfone | 2-hydroxynaphthalene-6-sulfonic acid | red |
| 10 | 3-(N-ethyl-β-sulfato-ethylsulfonylamino)-1-aminobenzene | 2-hydroxynaphthalene-3,6-disulfonic acid | red |
| 11 | 1-aminobenzene-3-β-sulfa-toethylsulfone | 2-acetylamino-5-hydroxynaphthalene-7-sulfonic acid | scarlet |
| 12 | 1-aminobenzene-3-β-sulfa-toethylsulfone | 1-acetylamino-5-hydroxynaphthalene-7-sulfonic acid | red |
| 13 | 1-aminobenzene-3-β-sulfa-toethylsulfone | 1-acetylamino-8-hydroxynaphthalene-3,6-disulfonic acid | red |
| 14 | 1-aminobenzene-3-β-sulfa-toethylsulfone | 1-benzoylamino-8-hydroxynaphthalene-3,6-disulfonic acid | bluish red |
| 15 | 1-aminonaphthalene-4-β-sulfatoethylsulfone | 1-benzoylamino-8-hydroxynaphthalene-4,6-disulfonic acid | red |
| 16 | 1-aminobenzene-3-β-sulfa-toethyl-sulfone | 2-acetylamino-8-hydroxynaphthalene-6-disulfonic acid | red |
| 17 | 1-aminobenzene-3-β-sulfa-toethylsulfone | [structure: copper complex azo dye with naphthalene sulfonic acid groups] | reddish blue |
| 18 | 1-aminobenzene-3-β-sulfa-toethylsulfone | [structure: amino-hydroxy-naphthalene sulfonic acid azo benzene sulfonic acid] | blue |
| 19 | 1-aminobenzene-3-β-sulfa-toethylsulfone | [structure: hydroxy-naphthalene sulfonic acid with fluorotriazinyl-aniline-SO₂CH₂CH₂OSO₃H] | red |
| 20 | 1-aminobenzene-3-β-sulfa-toethylsulfone | [structure: hydroxy-naphthalene sulfonic acid with fluorotriazinyl-aniline-SO₂CH₂CH₂OSO₃H] | scarlet |
| 21 | 3-β-sulfatoethyl-sulfonyl-amino-1-aminobenzene | 1-hydroxynaphthalene-4,6-disulfonic acid | red |

EXAMPLE 5

51.5 parts of aminophenylnaphthotriazole of the formula are dissolved in 900 parts of water at pH 5. Then 13.6 parts of 2,4,6-trifluoro-1,3,5-triazine are added dropwise at 0° C. and the pH is kept constant with 2N sodium hydroxide solution. When the reaction is complete, a solution of 7 parts of sodium nitrite in 50 parts of water is added to the reaction mixture, which is poured onto 25 parts by volume of 10N hydrochloric acid and 100 parts of crushed ice. Any excess nitrous acid is destroyed after an hour with amidosulfonic acid. To the diazo suspension are added 25.4 parts of 1-(4'-sulfophenyl)-3-methylpyrazolone (5) and the pH is kept constant at 5 with 2N sodium hydroxide solution. When the coupling is complete, 28 parts of 1-aminobenzene-3-β-sulfatoethylsulfone in 100 parts of water are added. The pH is raised to 6.5 and the temperature is allowed to rise gradually to 20° C. When the reaction is complete, the dye of the formula

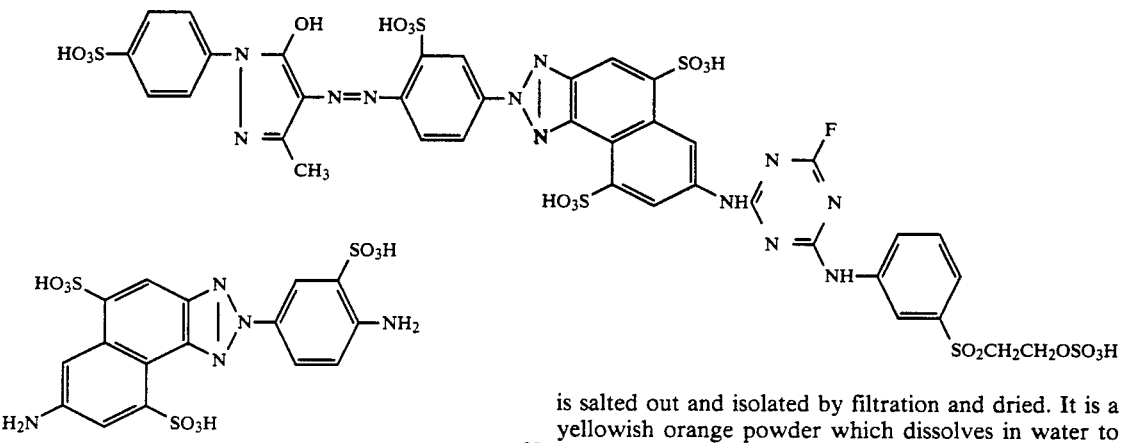

is salted out and isolated by filtration and dried. It is a yellowish orange powder which dissolves in water to give a yellow solution and dyes cotton in yellow shades.

The dyes listed in Table 5 are obtained in analogous manner by diazotising the compounds of column 2 after treatment with the reactive component, reacting further with a coupling component of column 3 and finally condensing with the amine of column 4.

TABLE 5

| No | Diazo component | Coupling component | Amine | Shade on cotton |
|----|-----------------|--------------------|-------|-----------------|
| 1 | ![structure with HO3S, N, N, N, SO3H, NH2, H2N, SO3H] | 1-(2'chlorophenyl-3-methyl-pyrazolone-(5) | 1-aminobenzene-3-β-phosphatoethyl-sulfone | yellow |
| 2 | " | 1-(4'-sulfophenyl)-3-carboxy-pyrazolone-(5) | 1-aminobenzene-3-β-sulfatoethyl-sulfone | yellow |
| 3 | " | 1-(2'-methyl-4'-sulfophenyl)-3-methylpyrazolone-(5) | 1-aminobenzene-3-β-sulfatoethyl-sulfone | yellow |
| 4 | " | 1-(2',5'-dichloro-4'-sulfophenyl)-3-methylpyrazolone-(5) | 1-aminobenzene-3-β-sulfatoethyl-sulfone | yellow |
| 5 | " | 1-(6'-chloro-3'-sulfophenyl)-3-methylpyrazolone-(5) | 1-aminobenzene-3-β-sulfatoethyl-sulfone | yellow |
| 6 | " | 1-(3'-sulfamoylphenyl)-3-methylpyrazolone-(5) | 1-aminobenzene-3-β-sulfatoethyl-sulfone | yellow |
| 7 | ![structure with HO3S, N, N, N, SO3H, NH2, H2N, SO3H] | 1-(2'-chloro-4-sulfophenyl)-3-methylpyrazolone-(5) | 1-aminobenzene-4-β-sulfatoethyl-sulfone | yellow |
| 8 | " | 1-(6'-sulfo-naphthyl-[2'])-3-methylpyrazolone-(5) | 1-aminobenzene-3-β-sulfatoethyl-sulfone | yellow |

TABLE 5-continued

| No | Diazo component | Coupling component | Amine | Shade on cotton |
|---|---|---|---|---|
| 9 | " | 1-(3'-sulfophenyl)-3-methyl-5-aminopyrazole | 1-aminobenzene-3-β-sulfatoethyl-sulfone | yellow |
| 10 | " | barbituric acid | 1-aminobenzene-3-β-sulfatoethyl-sulfone | yellow |
| 11 | " | 2-hydroxy-4-carboxypyridone-(6) | 1-aminobenzene-3-β-sulfatoethyl-sulfone | yellow |
| 12 | " | 1-ethyl-3-aminocarbonyl-4-methyl-6-hydroxypyridone-(2) | 1-aminobenzene-3-β-sulfatoethyl-sulfone | yellow |
| 13 | 2-amino-5-aminomethyl-naphthaline-1-sulfonic acid | 1-(4'-sulfophenyl-3-methyl-pyrazolone-(5) | 1-aminobenzene-3-β-sulfatoethyl-sulfone | yellow |
| 14 | 2-amino-5-aminomethyl-naphthaline-1-sulfonic acid | 1-ethyl-3-sulfomethyl-4-methyl-6-hydroxy-pyridone-(2)-5-carboxamide | 1-aminobenzene-3-β-sulfatoethyl-sulfone | yellow |
| 15 | 2-amino-5-aminomethyl-naphthaline-1-sulfonic acid | 1-benzoylamino-8-hydroxy-naphthaline-4,6-disulfonic acid | 1-aminobenzene-3-β-sulfatoethyl-sulfone | red |
| 16 | 2-amino-5-aminomethyl-naphthaline-1-sulfonic acid | 1-acetylamino-8-hydroxy-naphthaline-3,6-disulfonic acid | 1-aminobenzene-3-β-sulfatoethyl-sulfone | red |

EXAMPLE 6

28.1 parts of 1-aminobenzene-4-β-sulfatoethylsulfone are dissolved in 200 parts of water at pH 5. Then 13.6 parts of 2,4,6-trifluoro-1,3,5-triazine are added dropwise at 0° C. in the course of 5 minutes while adding 2N sodium hydroxide solution to ensure that the pH does not rise above 6. When the condensation is complete, a solution of 21 parts of the sodium salt of 1,3-diaminobenzene-4-sulfonic acid is added to the solution of the monocondensate. Condensation is carried out at pH 5 until no more diamine can be detected, and the temperature is allowed to rise to 20° C. The condensation product, which still contains a diazotisable amino group, is then diazotised in accordance with the particulars of Example 4. To the solution of the diazo compound are added 40.5 parts of the disodium salt of 1-acetylamino-8-hydroxynaphthalene-3,6-disulfonic acid and coupling is subsequently carried out at pH 6 to 6.5. The dye of the formula

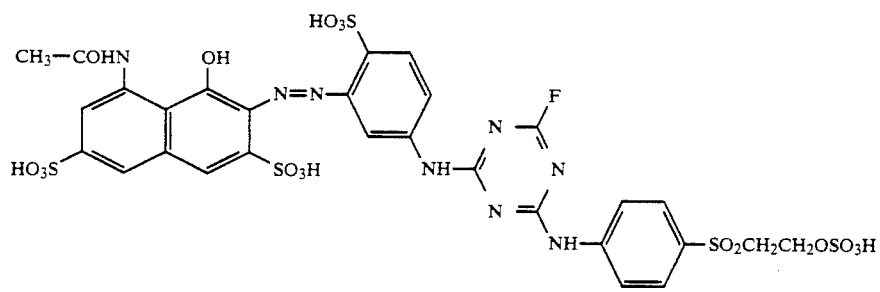

is precipitated with potassium chloride, isolated and dried. It is a red powder which dyes cotton in brilliant red shades.

Table 6 lists further dyes of this invention which can be obtained by condensing, according to the procedure of this Example, 2,4,6-trifluoro-1,3,5-triazine firstly with an amine of column 2 and then with a diaminobenzenesulfonic acid of column 3. Diazotisation of the secondary condensation product and coupling of the diazo compound to the coupling component of column 4 yields reactive dyes which dye cotton in the light- and wetfast shades indicated in column 5.

TABLE 6

| No | Amine | Diaminobenzene-sulfonic acid | Coupling component | Shade on cotton |
|---|---|---|---|---|
| 1 | 1-aminobenzene-4-β-sulfatoethylsulfone | 1,3-diaminobenzene-4-sulfonic acid | 1-(3'-sulfophenyl)-3-methyl-pyrazolone-(5) | yellow |
| 2 | 1-aminobenzene-4-β-sulfatoethylsulfone | 1,3-diaminobenzene-4-sulfonic acid | 1-(3'-sulfophenyl)-3-methyl-5-aminopyrazole | yellow |
| 3 | 1-aminobenzene-4-β-sulfatoethylsulfone | 1,3-diaminobenzene-4-sulfonic acid | 1-(2',5'-dichloro-4'-sulfophenyl)-3-methyl-pyrazolone-(5) | yellow |
| 4 | 1-aminobenzene-4-β-sulfatoethylsulfone | 1,3-diaminobenzene-4-sulfonic acid | 1-(5',7'-disulfonaphthyl[2'])-3-methyl-pyrazolone-(5) | yellow |
| 5 | 1-aminobenzene-4-β-sulfatoethylsulfone | 1,3-diaminobenzene-4-sulfonic acid | 1-ethyl-3-sulfomethyl-4-methyl-6-hydroxy-pyridone-(2)-5-carboxamide | yellow |
| 6 | 1-aminobenzene-4-β-sulfatoethylsulfone | 1,3-diaminobenzene-4-sulfonic acid | 2-aminonaphthalene-6-sulfonic acid | orange |
| 7 | 1-aminobenzene-4-β-sulfatoethylsulfone | 1,3-diaminobenzene-4-sulfonic acid | 2-aminonaphthalene-5,7-disulfonic acid | orange |
| 8 | 1-aminobenzene-4-β-sulfatoethylsulfone | 1,3-diaminobenzene-4-sulfonic acid | 2-N-methylamino-8-hydroxynaphthalene-6-sulfonic acid | orange |
| 9 | 1-aminobenzene-4-β- | 1,3-diaminobenzene-4- | 2-hydroxynaphthalene-3,6-disulfonic acid | scarlet |

TABLE 6-continued

| No | Amine | Diaminobenzene-sulfonic acid | Coupling component | Shade on cotton |
|---|---|---|---|---|
|  | sulfatoethylsulfone | sulfonic acid |  |  |
| 10 | 1-aminobenzene-4-β-sulfatoethylsulfone | 1,3-diaminobenzene-4-sulfonic acid | 2-acetylamino-5-hydroxynaphthalene-7-sulfonic acid | orange |
| 11 | 1-aminobenzene-4-β-sulfatoethylsulfone | 1,3-diaminobenzene-4-sulfonic acid | 1-benzoylamino-8-hydroxynaphthalene-3,6-disulfonic acid | red |
| 12 | 1-aminobenzene-4-β-sulfatoethylsulfone | 1,3-diaminobenzene-4-sulfonic acid | 1-acetylamino-8-hydroxy-naphthalene-4,6-disulfonic acid | red |
| 13 | 1-aminobenzene-4-β-sulfatoethylsulfone | 1,4-diaminobenzene-2-sulfonic acid | 1-(2'-methyl-4'-sulfophenyl)-3-carboxy-pyrazolone (5) | yellow |
| 14 | 1-aminobenzene-4-β-sulfatoethylsulfone | 1,4-diaminobenzene-2-sulfonic acid | 1-(2'-chloro-5'-sulfophenyl)-3-methylpyrazolone-(5) | red |

DYEING PROCEDURE 1

2 parts of the dye obtained according to Example 1 are dissolved in 100 parts of water while adding 0.5 part of sodium n-nitrobenzenesulfonate. A cotton fabric is impregnated with the resulting solution to a liquor pick-up of 75% and then dried.

The fabric is then impregnated with a warm solution of 20° C. which contains, per liter, 5 g of sodium hydroxide and 300 g of sodium chloride, and squeezed out to a pick-up of 75%. The dyeing is steamed for 30 seconds at 100° to 101° C., rinsed, soaped for a quarter of an hour in a 0,3% boiling solution of a non-ionic detergent, rinsed and dried.

DYEING PROCEDURE 2

2 parts of the dye obtained according to Example 1 are dissolved in 100 parts of water. The solution is added to 1900 parts of cold water, 60 parts of sodium chloride are added and 100 parts of a cotton fabric are put into this dyebath. The temperature is raised to 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

What is claimed is:

1. A reactive dye of the formula

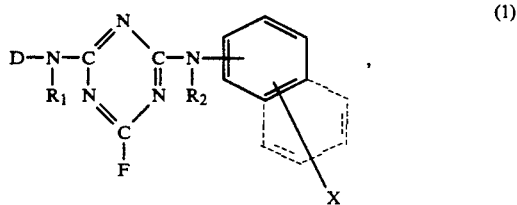

(1)

wherein D is the radical of a mono- or polyazo, copper complex azo, anthraquinone, phthalocyanine, formazane, dioxazine or stilbene dye which contains sulfo groups, $R_1$ is hydrogen or $C_1$-$C_4$ alkyl, $R_2$ is hydrogen, methyl or ethyl, X is a radical of the formula $-SO_2CH_2CH_2Cl$, $-SO_2CH=CH_2$, $-SO_2CH_2C-H_2OSO_3H$, $-SO_2CH_2CH_2OPO_3H$ or $-N(R_3-)SO_2CH_2CH_2OSO_3H$, and $R_3$ is hydrogen, methyl or ethyl, and the benzene or naphthalene radical is not further substituted or is further substituted by $C_1$-$C_4$ alkyl, $C_1$-$C_4$ alkoxy, halogen, nitro, hydroxyl, carboxyl or sulfo.

2. A reactive dye according to claim 1, of the formula

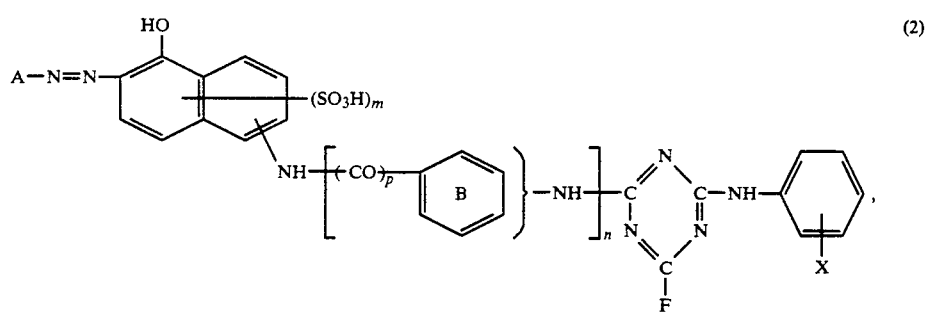

(2)

wherein A is benzene or naphthalene, m is 1 or 2, n is 0 or 1 and p is 0 or 1; while A and B are unsubstituted or further substituted by alkyl groups of 1 to 4 carbon atoms, alkoxy groups of 1 to 4 carbon atoms, carbacylamino groups of 1 to 6 carbon atoms, benzoylamino, halogen, nitro, cyano, trifluoromethyl, sulfamoyl, carbamoyl, ureido, hydroxyl, carboxyl, sulfomethyl or sulfo;

3. A reactive dye according to claim 1, wherein D is the radical of a mono- or disazo dye.

4. A reactive dye according to claim 3, wherein $R_1$ is hydrogen, methyl or ethyl, and each of $R_2$ and $R_3$ is hydrogen.

5. A copper complex azo dye according to claim 1.

6. The reactive dye of the formula

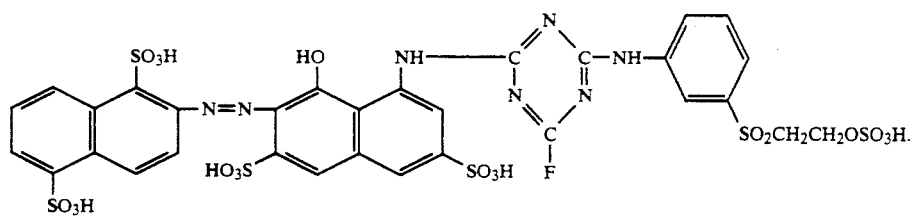
(3)